US012693256B2

(12) United States Patent
McKinlay et al.

(10) Patent No.: US 12,693,256 B2
(45) Date of Patent: Jul. 28, 2026

(54) ANALYTE SENSORS AND METHODS FOR IMPROVING INTERFERENT REJECTION AND LONGEVITY

(71) Applicant: Medtronic MiniMed, Inc., Northridge, CA (US)

(72) Inventors: Robert M. McKinlay, West Hills, CA (US); Quyen B. Ong, Arcadia, CA (US); Xin Heng, Arcadia, CA (US); Weihong Cui, La Crescenta, CA (US)

(73) Assignee: Medtronic MiniMed, Inc., Northridge (CA)

( * ) Notice: Subject to any disclaimer, the term of this patent is extended or adjusted under 35 U.S.C. 154(b) by 140 days.

(21) Appl. No.: 18/605,190

(22) Filed: Mar. 14, 2024

(65) Prior Publication Data

US 2025/0116625 A1     Apr. 10, 2025

Related U.S. Application Data

(60) Provisional application No. 63/462,700, filed on Apr. 28, 2023.

(51) Int. Cl.
*G01N 27/02* (2006.01)
*G01N 27/327* (2006.01)

(52) U.S. Cl.
CPC ......... *G01N 27/3272* (2013.01); *G01N 27/02* (2013.01); *G01N 27/3274* (2013.01)

(58) Field of Classification Search
CPC .... G01N 27/3272; G01N 27/48; G01N 27/26; G01N 27/327; G01N 27/10; G01N 27/06; G01N 27/3274; G01N 27/02; C12Q 1/00; C12Q 1/02; C12Q 1/006; C12Q 1/34; C12Q 1/54; A61B 5/14532; A61B 5/14865; A61B 5/1495
See application file for complete search history.

(56) References Cited

U.S. PATENT DOCUMENTS

| | | | |
|---|---|---|---|
| 4,562,751 A | 1/1986 | Nason et al. | |
| 4,573,994 A | 3/1986 | Fischell et al. | |
| 4,678,408 A | 7/1987 | Nason et al. | |
| 4,685,903 A | 8/1987 | Cable et al. | |
| 5,391,250 A | 2/1995 | Cheney et al. | |

(Continued)

OTHER PUBLICATIONS

Zhao, et al., "Multilayer membranes for glucose biosensing via layer-by-layer assembly of multiwall carbon nanotubes and glucose oxidase", Analytical Biochemistry, vol. 350, (2006) pp. 138-144.

(Continued)

*Primary Examiner* — Gurpreet Kaur
(74) *Attorney, Agent, or Firm* — Carter, DeLuca & Farrell, LLP

(57) ABSTRACT

An analyte sensor includes a microcontroller, a base layer, a conductive layer disposed on the base layer where the conductive layer includes a working electrode configured to provide a current signal in presence of glucose, an interference rejection membrane ("IRM") layer disposed on the working electrode where the IRM layer is negatively charged, and an enzyme layer disposed on the IRM layer where the enzyme layer includes an enzyme selected to generate a detectable electrical signal upon exposure to the glucose. The microcontroller is configured to process an electrochemical impedance spectroscopy (EIS) parameter to determine a state of the IRM layer.

14 Claims, 19 Drawing Sheets

(56) References Cited

U.S. PATENT DOCUMENTS

| 5,482,473 | A | 1/1996 | Lord et al. |
| 2011/0230735 | A1 | 9/2011 | Wolfe et al. |
| 2012/0097554 | A1 | 4/2012 | Shah et al. |
| 2013/0060105 | A1 | 3/2013 | Shah et al. |
| 2022/0395199 | A1 | 12/2022 | Garai et al. |

OTHER PUBLICATIONS

Extended European Search Report issued in corresponding application EP 24172185.1 dated Sep. 20, 2024 (10 pages).

1700 ⤺

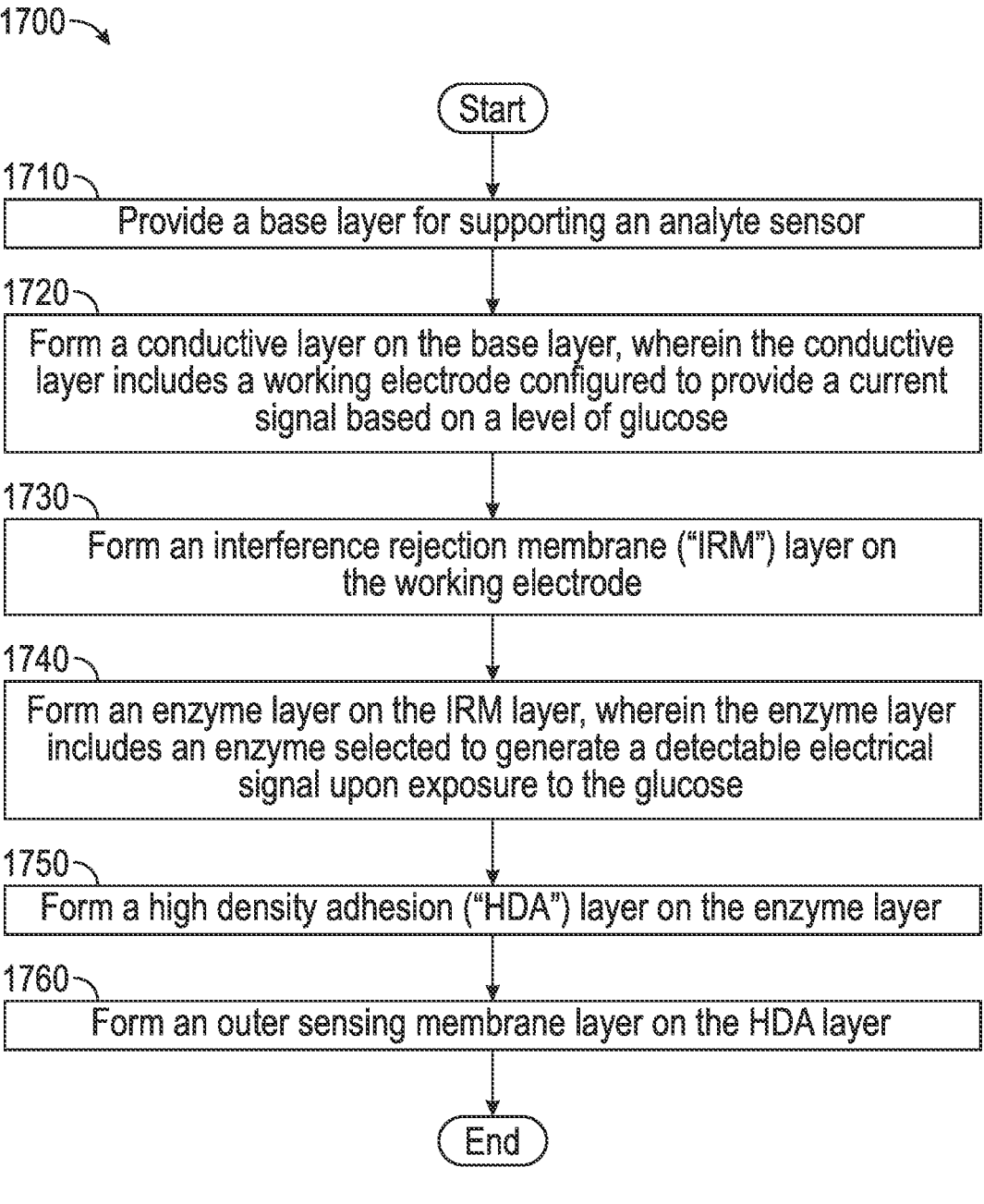

Start

1710 ⤵
Provide a base layer for supporting an analyte sensor

1720 ⤵
Form a conductive layer on the base layer, wherein the conductive layer includes a working electrode configured to provide a current signal based on a level of glucose 1730 ⤵
Form an interference rejection membrane ("IRM") layer on the working electrode 1740 ⤵
Form an enzyme layer on the IRM layer, wherein the enzyme layer includes an enzyme selected to generate a detectable electrical signal upon exposure to the glucose 1750 ⤵
Form a high density adhesion ("HDA") layer on the enzyme layer 1760 ⤵
Form an outer sensing membrane layer on the HDA layer End

ANALYTE SENSORS AND METHODS FOR IMPROVING INTERFERENT REJECTION AND LONGEVITY

CROSS-REFERENCE TO RELATED APPLICATIONS

This application claims the benefit of and priority to U.S. Provisional Patent Application Ser. No. 63/462,700 filed Apr. 28, 2023, the entire disclosure of which is incorporated by reference herein.

FIELD

The present disclosure relates generally to analyte sensor technology, and more particularly, to analytic sensors and methods for improving interferent rejection and longevity by employing two chemical layers.

BACKGROUND

Analyte sensors such as biosensors include devices that use biological elements to convert a chemical analyte in a matrix into a detectable signal. There are many types of biosensors used for a wide variety of analytes. The most studied type of biosensor is the amperometric glucose sensor, which has been instrumental to successful glucose level control for diabetes.

An analyte sensor, for example, typical glucose sensor, works according to the following chemical reactions:

$$\text{Glucose} + O_2 \xrightarrow{\text{Glucose Oxidase}} \text{Gluconic acid} + H_2O, \text{ and} \qquad \text{Equation 1}$$

$$H_2O_2 \longrightarrow O_2 + 2H^+ + 2e^-, \qquad \text{Equation 2}$$

The glucose oxidase is used to catalyze the reaction between glucose and oxygen to yield gluconic acid and hydrogen peroxide, $H_2O_2$, (Equation 1). The hydrogen peroxide reacts electrochemically as shown in Equation 2, and the current can be measured by a potentiostat. These reactions, which occur in a variety of oxidoreductases known in the art, are used in a number of sensor designs.

One common problem with analyte sensors is that they can electrochemically react not only with the analyte to be measured (or by-product of the enzymatic reaction with the analyte), but can also react with other electroactive chemical species that are not intentionally being measured, which causes an increase in signal strength due to these "interfering species." Typically, such interfering species are compounds with an oxidation or reduction potential that overlaps with the analyte to be measured (or by-product of the enzymatic reaction with the analyte). For example, in a conventional amperometric glucose oxidase-based glucose sensor where the conventional sensor measures hydrogen peroxide, interfering species such as acetaminophen, ascorbate, and urate are known to confound true analyte signals, resulting in loss of sensor sensitivity or longevity.

Another common problem is that the analyte sensors need time for sensor signals to stabilize due to different sensor designs. The term "early wear" refers to a first few days of testing/wearing of the sensor. Thus, there is room for improvement in design of analyte sensors to compensate for early wear problems.

SUMMARY

The present disclosure relates to analyte sensors and methods for improving interferent rejection and longevity by incorporating two chemical layers within the analyte sensors and modulating design features of the two chemical layers and related parameters. The two chemical layers are an interferent rejection membrane ("IRM") layer and a high density adhesion ("HDA") layer. The IRM layer is utilized to reject interferents of sensing functions (e.g., acetaminophen ("AC")), and the HDA layer cooperates with the IRM layer to improve interferent rejection abilities and to improve sensor longevity.

In accordance with aspects of the present disclosure, an analyte sensor includes a microcontroller, a base layer, a conductive layer disposed on the base layer where the conductive layer includes a working electrode configured to provide a current signal in presence of glucose, an interference rejection membrane ("IRM") layer disposed on the working electrode where the IRM layer is negatively charged, and an enzyme layer disposed on the IRM layer where the enzyme layer includes an enzyme selected to generate a detectable electrical signal upon exposure to the glucose. The microcontroller is configured to process an electrochemical impedance spectroscopy (EIS) parameter to determine a state of the IRM layer.

In various aspects of the analyte sensor, the EIS parameter is median imaginary impedance, and the microcontroller is configured to determine the state of the IRM layer based on the median imaginary impedance.

In various aspects of the analyte sensor, lower median imaginary impedance corresponds to slower hydration rate within the IRM layer, and higher median imaginary impedance corresponds to faster hydration rate within the IRM layer.

In various aspects of the analyte sensor, the microprocessor is further configured to determine an EIS signature value computed based on a dielectric property of the IRM layer.

In various aspects of the analyte sensor, the microprocessor is further configured to, during an early wear period, adjust an analyte measurement based on the EIS signature value.

In various aspects of the analyte sensor, during the early wear period, the analyte measurement is adjusted further based on a reference EIS signature value.

In various aspects of the analyte sensor, the reference EIS signature value corresponds to a stabilized period that is at least partially after the early wear period.

In various aspects of the analyte sensor, the analyte sensor further includes a high density adhesion ("HDA") layer disposed on the enzyme layer, the HDA layer being positively charged.

In accordance with aspects of the present disclosure, a method in an analyte sensor is disclosed. The analyte sensor includes a microcontroller, a base layer, a conductive layer disposed on the base layer where the conductive layer includes a working electrode configured to provide a current signal in presence of glucose, an interference rejection membrane ("IRM") layer disposed on the working electrode where the IRM layer is negatively charged, and an enzyme layer disposed on the IRM layer where the enzyme layer includes an enzyme selected to generate a detectable electrical signal upon exposure to the glucose. The method includes, by the microprocessor, processing an electrochemical impedance spectroscopy (EIS) parameter to determine a state of the IRM layer of the analyte sensor.

In various aspects of the method, the EIS parameter is median imaginary impedance, and processing the EIS parameter to determine the state of the IRM layer includes determining the state of the IRM layer based on the median imaginary impedance.

In various aspects of the method, lower median imaginary impedance corresponds to slower hydration rate within the IRM layer, and higher median imaginary impedance corresponds to faster hydration rate within the IRM layer.

In various aspects of the method, the method includes, by the microprocessor, determining an EIS signature value based on a dielectric property of the IRM layer.

In various aspects of the method, the method includes during an early wear period, adjusting an analyte measurement based on the EIS signature value.

In various aspects of the method, during the early wear period, the analyte measurement is adjusted further based on a reference EIS signature value.

In various aspects of the method, the reference EIS signature value corresponds to a stabilized period that is at least partially after the early wear period.

In various aspects of the method, the analyte sensor further includes a high density adhesion ("HDA") layer disposed on the enzyme layer, the HDA layer being positively charged.

In accordance with aspects of the present disclosure, a method of identifying adjusting a sensor value when an early wear run-in problem occurs in an analyte sensor includes implanting an analyte sensor into a body of a user. The analyte sensor includes a base layer, a conductive layer disposed on the base layer where the conductive layer includes a working electrode configured to provide a current signal in presence of glucose, an interference rejection membrane ("IRM") layer disposed on the working electrode where the IRM layer is negatively charged, an enzyme layer disposed on the IRM layer where the enzyme layer includes an enzyme selected to generate a detectable electrical signal upon exposure to the glucose, and a high density adhesion ("HDA") layer disposed on the enzyme layer where the HDA layer is positively charged. The method includes accessing an electrochemical impedance spectroscopy (EIS) signature value for each predetermined period during an initial portion of a lifetime of the analyte sensor, calculating a difference between the EIS signature value and a reference value, and adjusting a sensor value when the difference between EIS signature values and the reference value is greater than a predetermined threshold. The reference value is predetermined based on a design configuration of the analyte sensor. The EIS signature value is calculated based on a dielectric property of the IRM layer.

In various aspects of the method, the analyte sensor further includes a high density adhesion ("HDA") layer disposed on the enzyme layer, the HDA layer being positively charged.

The details of one or more aspects of the disclosure are set forth in the accompanying drawings and the description below. Other features, objects, and advantages of the techniques described in this disclosure will be apparent from the description and drawings, and from the claims.

BRIEF DESCRIPTION OF THE DRAWINGS

A detailed description of aspects of the disclosure will be made with reference to the accompanying drawings, wherein like numerals designate corresponding parts in the figures.

FIG. 17 illustrates a flowchart of a method of manufacturing an analyte sensor, in accordance with one or more aspects.

DETAILED DESCRIPTION

In the following description, reference is made to the accompanying drawings which form a part hereof and which illustrate several aspects of the present disclosure. It is understood that other aspects may be utilized, and structural and operational changes may be made without departing from the scope of the present disclosure.

The aspects herein are described below with reference to flowchart illustrations of methods, systems, devices, apparatus, and programming and computer program products. It will be understood that each block of the flowchart illustrations, and combinations of blocks in the flowchart illustrations, can be implemented by programming instructions, including computer program instructions (as can any menu screens described in the figures). These computer program instructions may be loaded onto a computer or other programmable data processing apparatus (such as a controller, microcontroller, or processor in a sensor electronics device) to produce a machine, such that the instructions which execute on the computer or other programmable data processing apparatus create instructions for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instructions which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks, and/or menus presented herein. Programming instructions may also be stored in and/or implemented via electronic circuitry, including integrated circuits (ICs) and Application Specific Integrated Circuits (ASICs) used in conjunction with sensor devices, apparatuses, and systems.

Figure 1:
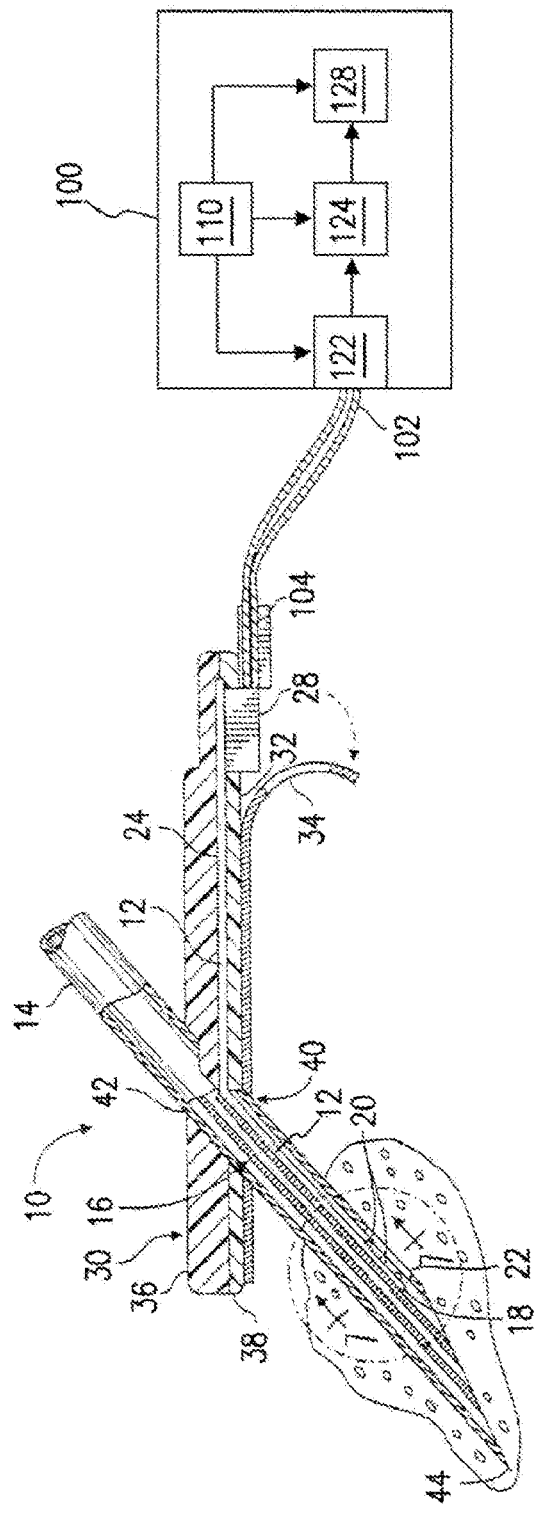
FIG. 1 illustrates a perspective view of a subcutaneous sensor insertion set and a block diagram of an analyte sensor electronics device, in accordance with one or more aspects.

FIG. 1 is a perspective view of a subcutaneous sensor insertion set and a block diagram of a sensor electronics device according to various aspects of the disclosure. As illustrated in FIG. 1, a subcutaneous sensor set 10 is provided for subcutaneous placement of an active portion of an analyte sensor 12 (see, e.g., FIG. 2), or the like, at a selected site in the body of a user. The subcutaneous or percutaneous portion of the sensor set 10 includes a hollow, slotted insertion needle 14, and a cannula 16. The needle 14 is used to facilitate quick and easy subcutaneous placement of the cannula 16 at the subcutaneous insertion site. Inside the cannula 16 is a sensing portion 18 of the analyte sensor 12 to expose one or more sensor electrodes 20 to the user's bodily fluids through a window 22 formed in the cannula 16. In an aspect of the disclosure, the one or more sensor electrodes 20 may include a counter electrode, a reference electrode, and one or more working electrodes. After insertion, the insertion needle 14 is withdrawn to leave the cannula 16 with the sensing portion 18 and the sensor electrodes 20 in place at the selected insertion site.

In particular aspects, the subcutaneous sensor set 10 facilitates accurate placement of a flexible thin film electrochemical analyte sensor 12 of the type used for monitoring specific blood parameters representative of a user's condition. The analyte sensor 12 monitors glucose levels in the body and may be used in conjunction with automated or semi-automated medication infusion pumps of the external or implantable type as described, e.g., in U.S. Pat. No. 4,562,751; 4,678,408; 4,685,903 or 4,573,994, the entire contents of which are incorporated herein by reference, to control delivery of insulin to a diabetic patient.

Particular aspects of the flexible analyte sensor 12 are constructed in accordance with thin film mask techniques to include elongated thin film conductors embedded or encased between layers of a selected insulative material such as polyimide film or sheet, and membranes. The sensor electrodes 20 at a tip end of the sensing portion 18 are exposed through one of the insulative layers for direct contact with patient blood or other body fluids, when the sensing portion 18 (or active portion) of the analyte sensor 12 is subcutaneously placed at an insertion site. The sensing portion 18 is joined to a connection portion 24 that terminates in conductive contact pads, or the like, which are also exposed through one of the insulative layers. In alternative aspects, other types of implantable sensors, such as chemical based, optical based, or the like, may be used.

As is known in the art, the connection portion 24 and the contact pads are generally adapted for a direct wired electrical connection to a suitable monitor or sensor electronics device 100 for monitoring a user's condition in response to signals derived from the sensor electrodes 20. Further description of flexible thin film sensors of this general type may be found, e.g., in U.S. Pat. No. 5,391,250, which is herein incorporated by reference. The connection portion 24 may be conveniently connected electrically to the monitor or sensor electronics device 100 or by a connector block 28 (or the like) as shown and described, e.g., in U.S. Pat. No. 5,482,473, which is also herein incorporated by reference. Thus, in accordance with aspects of the present disclosure, subcutaneous sensor sets 10 may be configured or formed to work with either a wired or a wireless characteristic monitor system.

The sensor electrodes 20 may be used in a variety of sensing applications and may be configured in a variety of ways. For example, the sensor electrodes 20 may be used in physiological parameter sensing applications in which some type of biomolecule is used as a catalytic agent. For example, the sensor electrodes 20 may be used in a glucose and oxygen sensor having a glucose oxidase (GOx) enzyme catalyzing a reaction with the sensor electrodes 20. The reaction produces Gluconic Acid ($C_6H_{12}O_7$) and Hydrogen Peroxide ($H_2O_2$) in proportion to the amount of glucose present.

The sensor electrodes 20, along with a biomolecule or some other catalytic agent, may be placed in a human body in a vascular or non-vascular environment. For example, the sensor electrodes 20 and biomolecule may be placed in a vein and be subjected to a blood stream, or may be placed in a subcutaneous or peritoneal region of the human body.

The monitor 100 may also be referred to as a sensor electronics device 100. The monitor 100 may include a power source 110, a sensor interface 122, processing electronics 124, and data formatting electronics 128. The monitor 100 may be coupled to the sensor set 10 by a cable 102 through a connector that is electrically coupled to the connector block 28 of the connection portion 24. In an alternative aspect, the cable 102 may be omitted. In this aspect of the disclosure, the monitor 100 may include an appropriate connector for direct connection to the connection portion 104 of the sensor set 10. The sensor set 10 may be modified to have the connector portion 104 positioned at a different location, e.g., on top of the sensor set 10 to facilitate placement of the monitor 100 over the sensor set 10.

In aspects of the disclosure, the sensor interface 122, the processing electronics 124, and the data formatting electronics 128 are formed as separate semiconductor chips, however, alternative aspects may combine the various semiconductor chips into a single or multiple customized semiconductor chips. The sensor interface 122 connects with the cable 102 that is connected with the sensor set 10.

The power source 110 may be a battery. The battery can include three series silver oxide battery cells. In alternative aspects, different battery chemistries may be utilized, such as lithium based chemistries, alkaline batteries, nickel metalhydride, or the like, and a different number of batteries may be used. The monitor 100 provides power to the sensor set via the power source 110, through the cable 102 and cable connector 104. In an aspect of the disclosure, the power is a voltage provided to the sensor set 10. In an aspect of the disclosure, the power is a current provided to the sensor set 10. In an aspect of the disclosure, the power is a voltage provided at a specific voltage to the sensor set 10.

Figure 2:
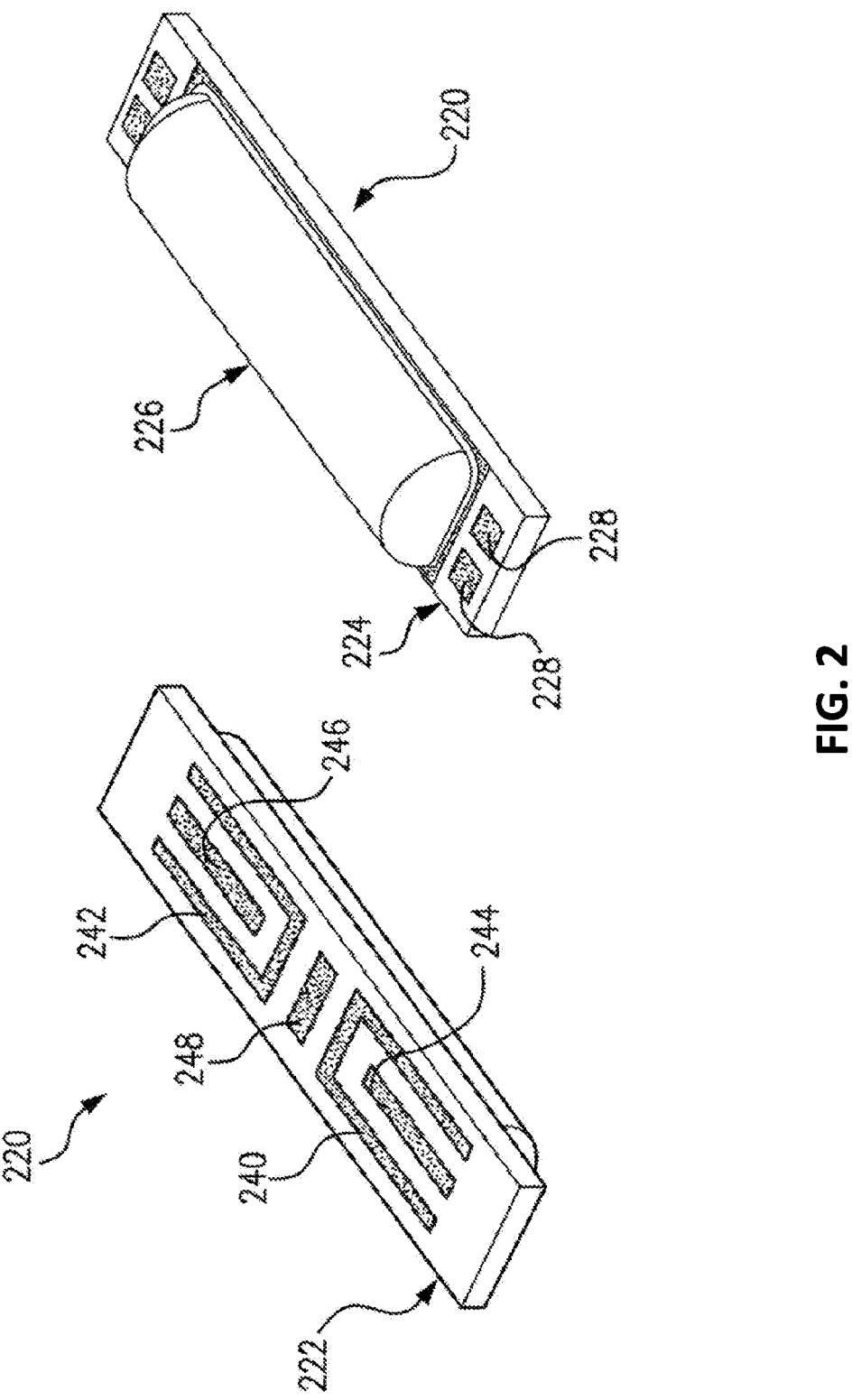
FIG. 2 illustrates a substrate having a first side which contains an electrode configuration and a second side which contains electronic circuitry, in accordance with one or more aspects.

FIG. 2 illustrates an implantable analyte sensor and electronics for driving the implantable analyte sensor according to an aspect of the present disclosure. FIG. 2 shows a substrate or flex 220 having two sides; a first side 222 which contains an electrode configuration and a second side 224 of which contains electronic circuitry. As in FIG. 2, the first side 222 of the substrate includes two counter electrode-working electrode pairs 240, 242, 244, 246 on opposite sides of a reference electrode 248. A second side 224 of the substrate includes electronic circuitry. As shown, the electronic circuitry may be enclosed in a hermetically sealed casing 226, providing a protective housing for the electronic circuitry. This allows the sensor substrate 220 to be inserted into a vascular environment or other environment which may subject the electronic circuitry to fluids. By sealing the electronic circuitry in a hermetically sealed casing 226, the electronic circuitry may operate without risk of short circuiting by the surrounding fluids. Also shown in FIG. 2, pads 228 are connected to the input and output lines of the electronic circuitry. The electronic circuitry itself may be fabricated in a variety of ways. According to an aspect of the present disclosure, the electronic circuitry may be fabricated as an integrated circuit using techniques common in the industry.

Figure 3:
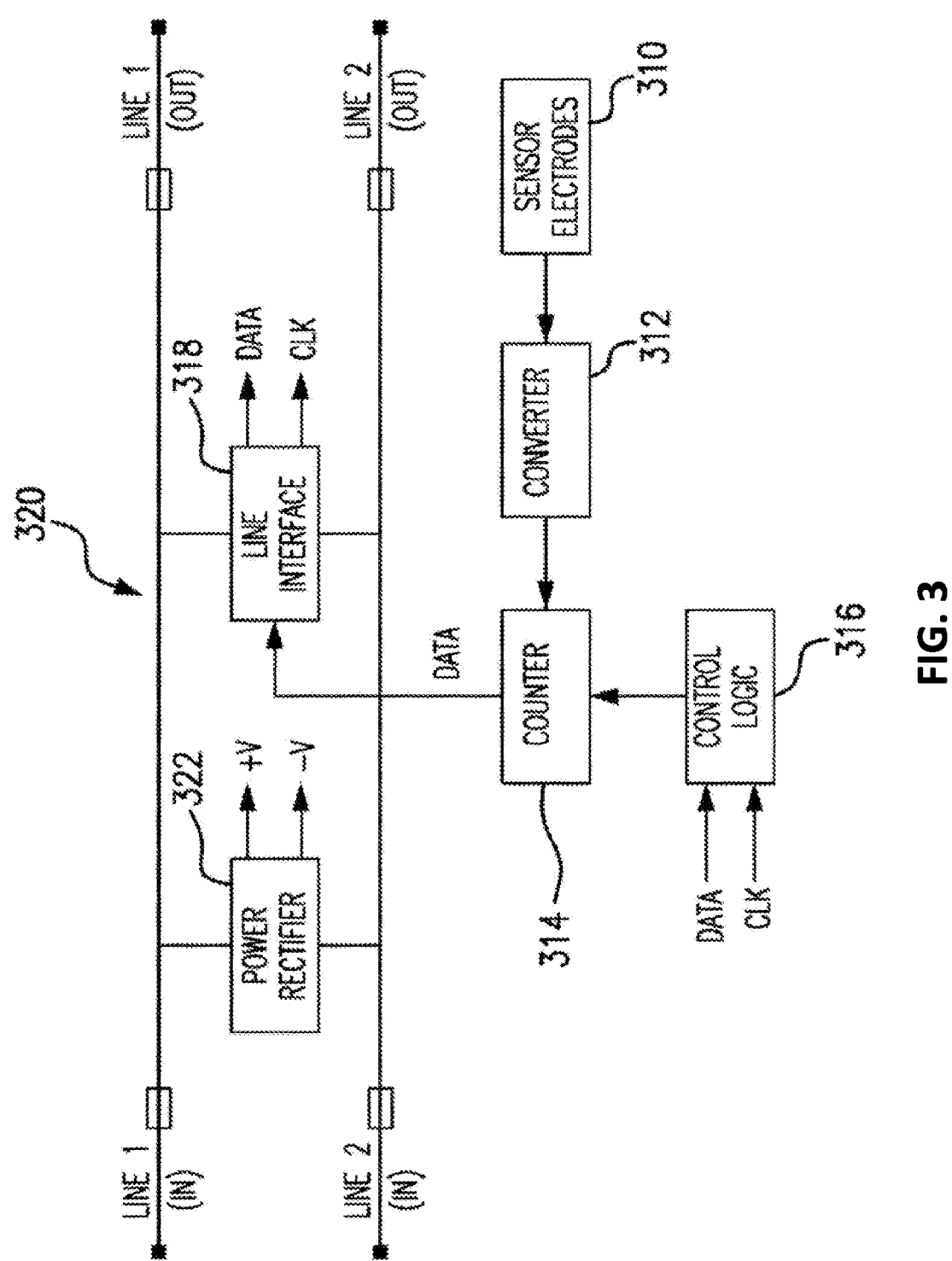
FIG. 3 illustrates a block diagram of an electronic circuit for sensing an output of an analyte sensor, in accordance with one or more aspects.

FIG. 3 illustrates a general block diagram of an electronic circuit for sensing an output of an analyte sensor according to aspects of the present disclosure. At least one pair of sensor electrodes 310 may interface to a data converter 312, the output of which may interface to a counter 314. The counter 314 may be controlled by control logic 316. The output of the counter 314 may connect to a line interface 318. The line interface 318 may be connected to input and output lines 320 and may also connect to the control logic 316. The input and output lines 320 may also be connected to a power rectifier 322.

The sensor electrodes 310 may be used in a variety of sensing applications and may be configured in a variety of ways. For example, the sensor electrodes 310 may be used in physiological parameter sensing applications in which some type of biomolecule is used as a catalytic agent. For example, the sensor electrodes 310 may be used in a glucose and oxygen sensor having a glucose oxidase (GOx) enzyme catalyzing a reaction with the sensor electrodes 310. The sensor electrodes 310, along with a biomolecule or some other catalytic agent, may be placed in a human body in a vascular or non-vascular environment. For example, the sensor electrodes 310 and biomolecule may be placed in a vein and be subjected to a blood stream.

Figure 4:
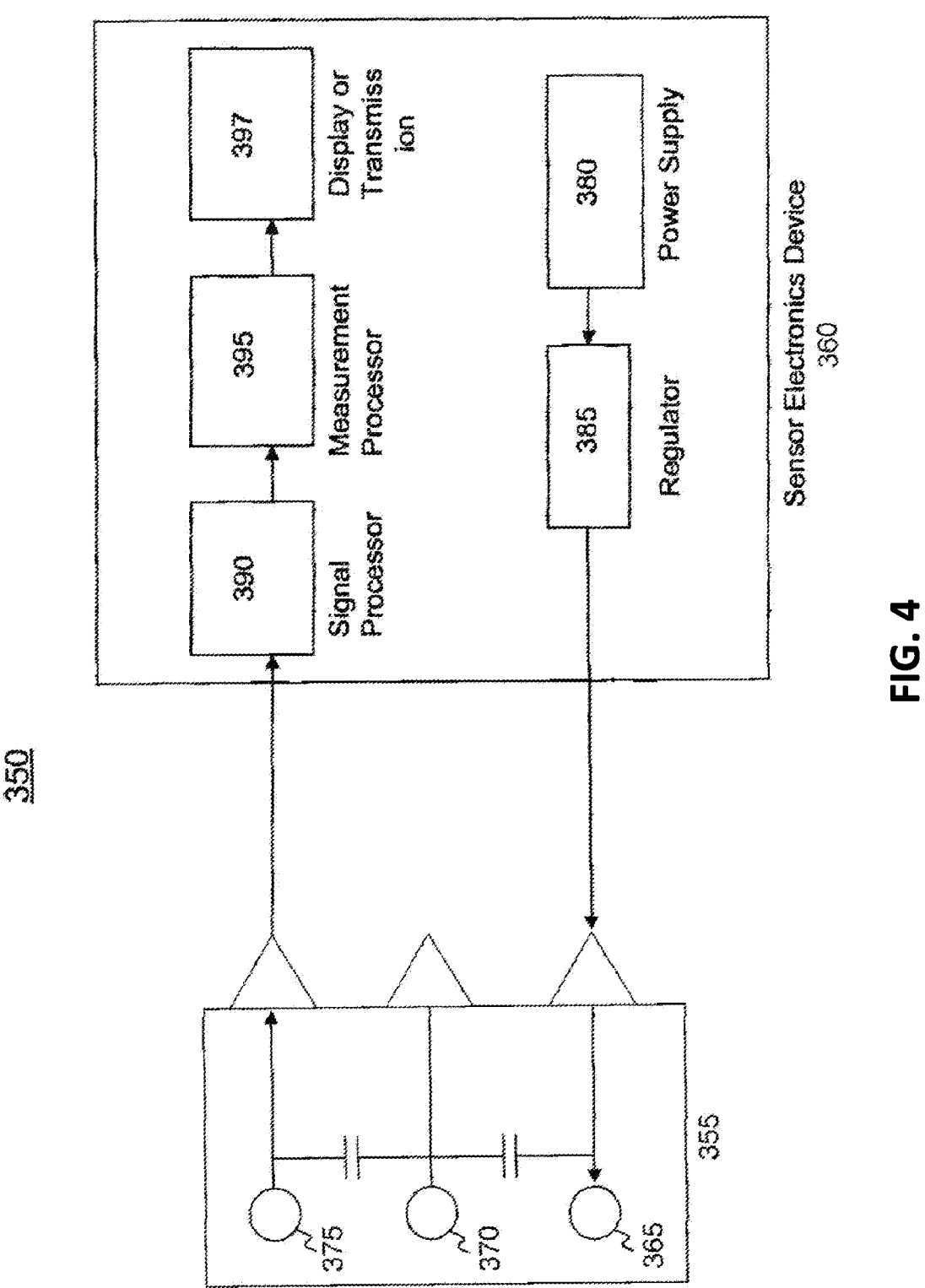
FIG. 4 illustrates a block diagram of an analyte sensor electronics device and a sensor including a plurality of electrodes, in accordance with one or more aspects.

FIG. 4 illustrates a block diagram of an analyte sensor electronics device and a sensor including a plurality of electrodes according to an aspect of the disclosure. The sensor set or system 350 includes an analyte sensor 355 and a sensor electronics device 360. The analyte sensor 355 includes a counter electrode 365, a reference electrode 370, and a working electrode 375. The sensor electronics device 360 includes a power supply 380, a regulator 385, a signal processor 390, a measurement processor 395, and a display/transmission module 397. The power supply 380 provides power (in the form of either a voltage, a current, or a voltage including a current) to the regulator 385. The regulator 385 transmits a regulated voltage to the analyte sensor 355. In an aspect of the disclosure, the regulator 385 transmits a voltage to the counter electrode 365 of the analyte sensor 355.

The analyte sensor 355 creates a sensor signal indicative of a concentration of a physiological characteristic being measured. For example, the sensor signal may be indicative of a blood glucose reading. In an aspect of the disclosure, utilizing subcutaneous sensors, the sensor signal may represent a level of hydrogen peroxide in a subject. In an aspect of the disclosure, where blood or cranial sensors are utilized, the amount of oxygen is being measured by the sensor and is represented by the sensor signal. In an aspect of the disclosure, utilizing implantable or long-term sensors, the sensor signal may represent a level of oxygen in the subject. The sensor signal may be measured at the working electrode 375. In an aspect of the disclosure, the sensor signal may be a current measured at the working electrode. In an aspect of the disclosure, the sensor signal may be a voltage measured at the working electrode.

The signal processor 390 receives the sensor signal (e.g., a measured current or voltage) after the sensor signal is measured at the analyte sensor 355 (e.g., the working electrode). The signal processor 390 processes the sensor signal and generates a processed sensor signal. The measurement processor 395 receives the processed sensor signal and calibrates the processed sensor signal utilizing reference values. In an aspect of the disclosure, the reference values are stored in a reference memory and provided to the measurement processor 395. The measurement processor 395 generates sensor measurements. The sensor measurements may be stored in a measurement memory (not shown). The sensor measurements may be sent to a display/transmission device to be either displayed on a display in a housing with the sensor electronics or transmitted to an external device.

The sensor electronics device 360 may be a monitor which includes a display to display physiological characteristics readings. The sensor electronics device 360 may also be installed in a desktop computer, a pager, a television including communications capabilities, a laptop computer, a server, a network computer, a personal digital assistant (PDA), a portable telephone including computer functions, an infusion pump including a display, and/or a combination infusion pump/analyte sensor. The sensor electronics device 360 may be housed in a cellular phone, a smartphone, a network device, a home network device, and/or other appliance connected to a home network.

Figure 5:
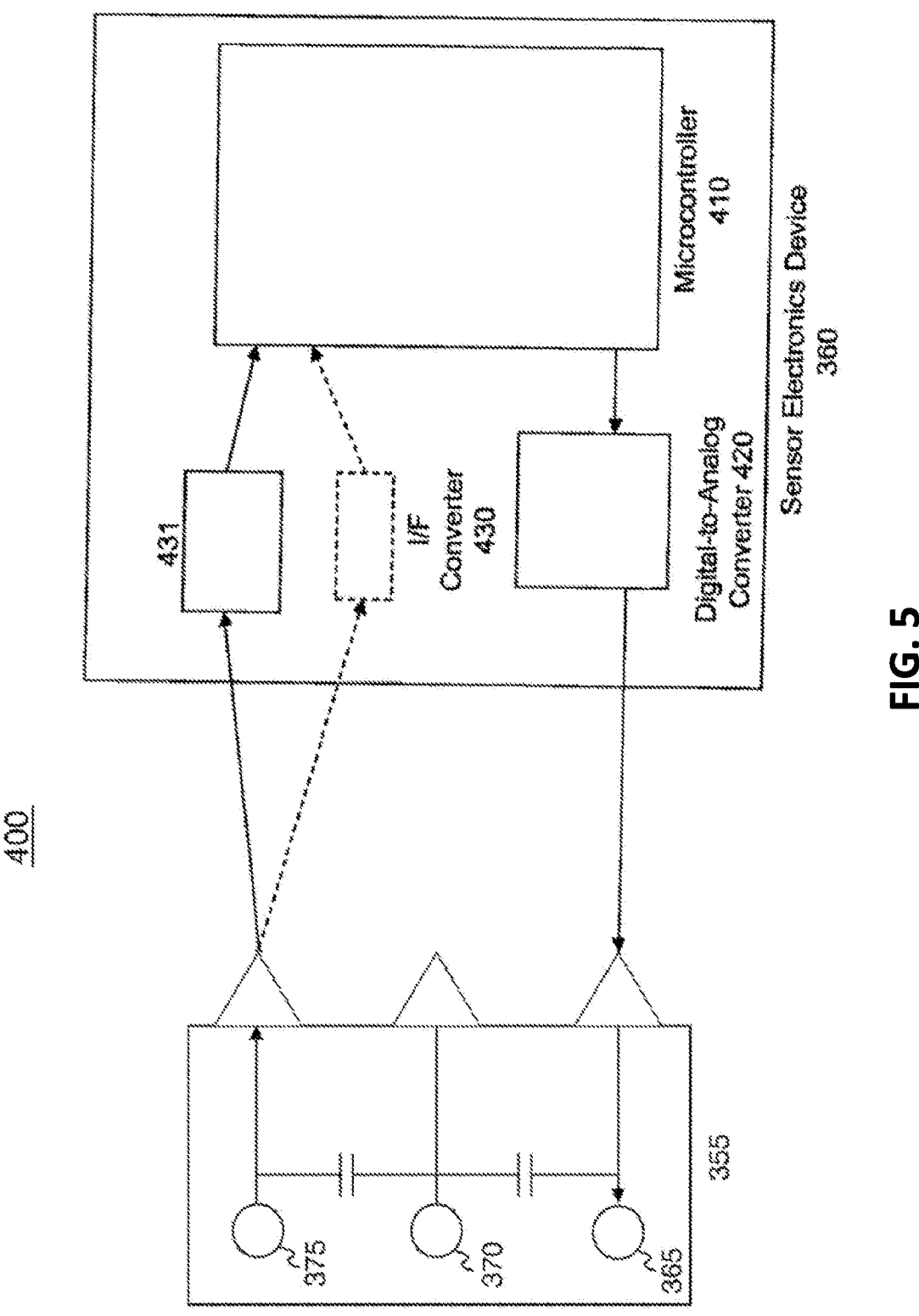
FIG. 5 illustrates an alternative aspect including a sensor and a sensor electronics device, in accordance with one or more aspects.

FIG. 5 illustrates an alternative aspect including an analyte sensor and a sensor electronics device according to an aspect of the present disclosure. The sensor set or sensor system 400 includes the sensor electronics device 360 and the analyte sensor 355. The analyte sensor 355 includes the counter electrode 365, the reference electrode 370, and the working electrode 375. The sensor electronics device 360 includes a microcontroller 410 and a digital-to-analog converter (DAC) 420. The sensor electronics device 360 may also include a current-to-frequency converter (I/F converter) 430.

The microcontroller 410 includes software program code or programmable logic which, when executed, causes the microcontroller 410 to transmit a signal to the DAC 420, where the signal is representative of a voltage level or value that is to be applied to the analyte sensor 355. The DAC 420 receives the signal and generates the voltage value at the level instructed by the microcontroller 410. In aspects of the disclosure, the microcontroller 410 may change the representation of the voltage level in the signal frequently or infrequently. Illustratively, the signal from the microcontroller 410 may instruct the DAC 420 to apply a first voltage value for one second and a second voltage value for two seconds.

The analyte sensor 355 may receive the voltage level or value. In an aspect of the disclosure, the counter electrode 365 may receive the output of an operational amplifier which has as inputs the reference voltage and the voltage value from the DAC 420. The application of the voltage level causes the analyte sensor 355 to create a sensor signal indicative of a concentration of a physiological characteristic being measured. In an aspect of the disclosure, the microcontroller 410 may measure the sensor signal (e.g., a current value) from the working electrode. Illustratively, a sensor signal measurement circuit 431 may measure the sensor signal. In an aspect of the disclosure, the sensor signal measurement circuit 431 may include a resistor and the current may be passed through the resistor to measure the value of the sensor signal. In an aspect of the disclosure, the sensor signal may be a current level signal and the sensor signal measurement circuit 431 may be a current-to-frequency (I/F) converter 430. The I/F converter 430 may measure the sensor signal in terms of a current reading, convert it to a frequency-based sensor signal or electrochemical impedance spectroscopy ("EIS") signal, and transmit the frequency-based sensor signal or EIS signal to the microcontroller 410. Persons skilled in the art will understand how to implement and apply EIS. Various aspects of EIS signals are described in U.S. Patent Application Publication No. US20130060105A1, which is hereby incorporated by reference herein in its entirety. In aspects of the disclosure, the microcontroller 410 may be able to receive frequency-based sensor signals easier than non-frequency-based sensor signals. The microcontroller 410 receives the sensor signal, whether frequency-based or non-frequency-based, and determines a value for the physiological characteristic of a subject, such as a blood glucose level. The microcontroller 410 may include program code, which when executed or run, is able to receive the sensor signal and convert the sensor signal to a physiological characteristic value.

In one aspect of the disclosure, the microcontroller 410 may convert the sensor signal to a blood glucose level. While converting the sensor signal to a blood glucose value, the microcontroller 410 may use one or more models, which are specific ways to use the sensor signal to calculate the blood glucose value. In some aspects, the microcontroller 410 may utilize measurements (e.g., sensor signals and electrochemical impedance spectroscopy (EIS) signals from the analyte sensor 355) stored within an internal memory in order to determine the blood glucose level of the subject. In some aspects, the microcontroller 410 may utilize measurements stored within a memory external to the microcontroller 410 to assist in determining the blood glucose level of the subject.

After the physiological characteristic value is determined by the microcontroller 410, the microcontroller 410 may store measurements of the physiological characteristic values for a number of time periods. For example, a blood glucose value (BG) may be sent to the microcontroller 410 from the sensor every second or five seconds, and the microcontroller may save sensor measurements for five minutes or ten minutes of BG readings. The microcontroller 410 may transfer the measurements of the physiological characteristic values to a display on the sensor electronics device 360. For example, the sensor electronics device 360 may be a monitor which includes a display that provides a blood glucose reading for a subject. In one aspect of the disclosure, the microcontroller 410 may transfer the measurements of the physiological characteristic values to an output interface of the microcontroller 410. The output interface of the microcontroller 410 may transfer the measurements of the physiological characteristic values, e.g., blood glucose values, to an external device, e.g., an infusion pump, a combined infusion pump/glucose meter, a computer, a personal digital assistant, a pager, a network appliance, a server, a cellular phone, or any computing device.

Figure 6:
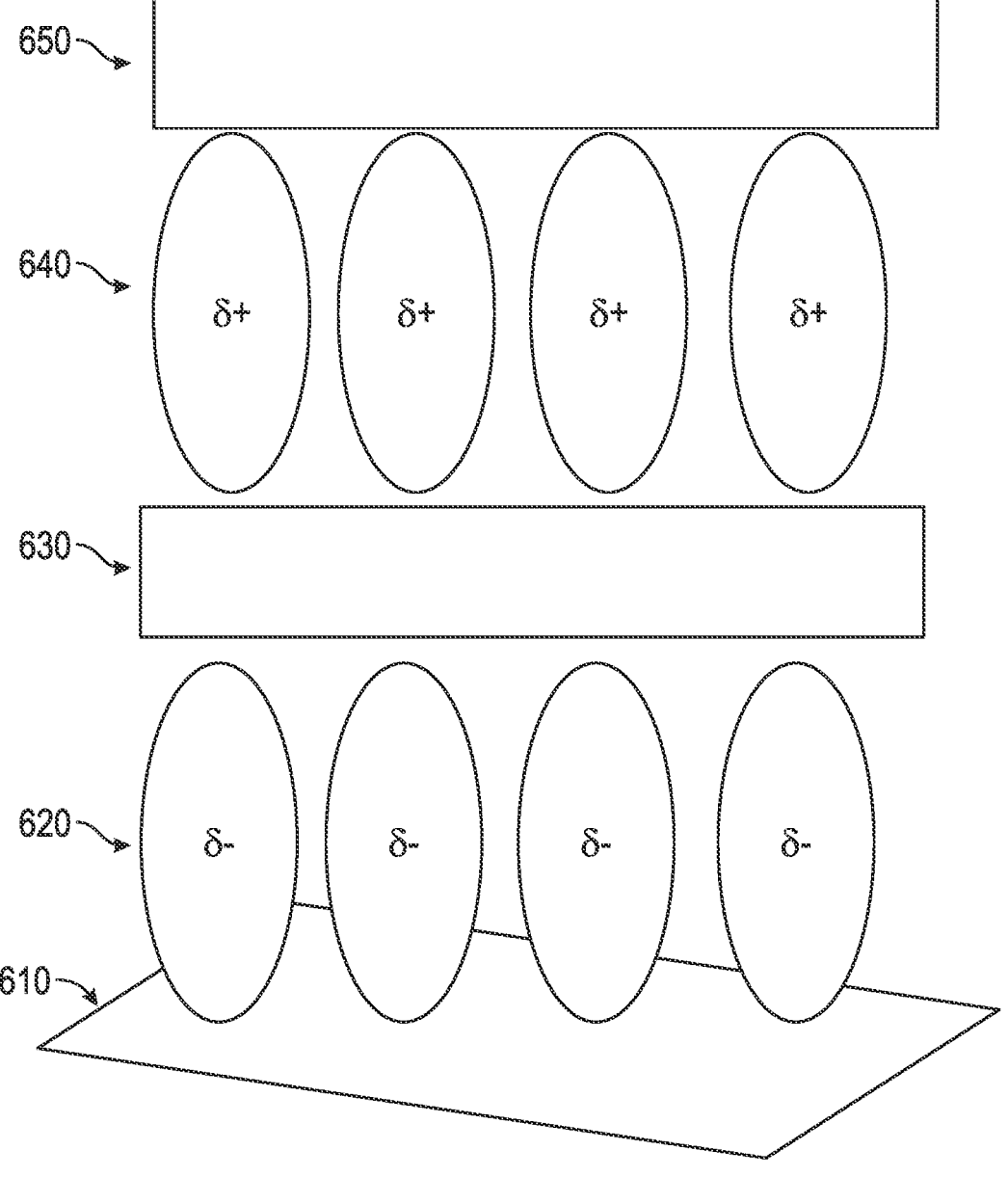
FIG. 6 illustrates a graphical representation of chemical layers disposed on a working electrode of an analyte sensor, in accordance with one or more aspects.

Now referring back to FIG. 2, the electrodes 240, 242, 244, 246 may be covered with layers that protect the electrodes, thereby lengthening the lifetime of the analyte sensor and enhancing interferent rejection abilities. A design as illustrated in FIG. 6 shows incorporation of the two chemical layers over the electrode 610 (e.g., the electrodes 240, 242, 244, 246 of FIG. 2, the electrodes 310 of FIG. 3, or the electrodes 365, 370, 375 of FIGS. 4 and 5). The electrode 610 is coated with an interferent rejection membrane ("IRM") layer 620, which is covered by an enzyme layer 630.

The IRM layer 620 is configured to prevent interferents such as acetaminophen and ascorbic acid, among others, from contacting working electrodes in the analyte sensor and generating spurious electronic signals that do not reflect the presence of the target sensor analyte. At the same time, the IRM layer 620 may complicate the sensor manufacturing process, such as in situations where the IRM layer 620 has to be selectively coated on certain areas of the analyte sensor (e.g., a working electrode) but not on other areas (e.g., sensor electrical contact pads).

In aspects, a working electrode (e.g., the electrode 375 of FIGS. 4 and 5) may be coated with the IRM layer 620 and the other working electrodes (e.g., the counter and reference electrodes 365, 370 of FIGS. 4 and 5 or another working electrode) may not be coated with the IRM layer 620. In this way, it is possible to compare signals from these electrodes to characterize the effect of interfering agents (e.g., acetaminophen) on the signals.

Figure 7:
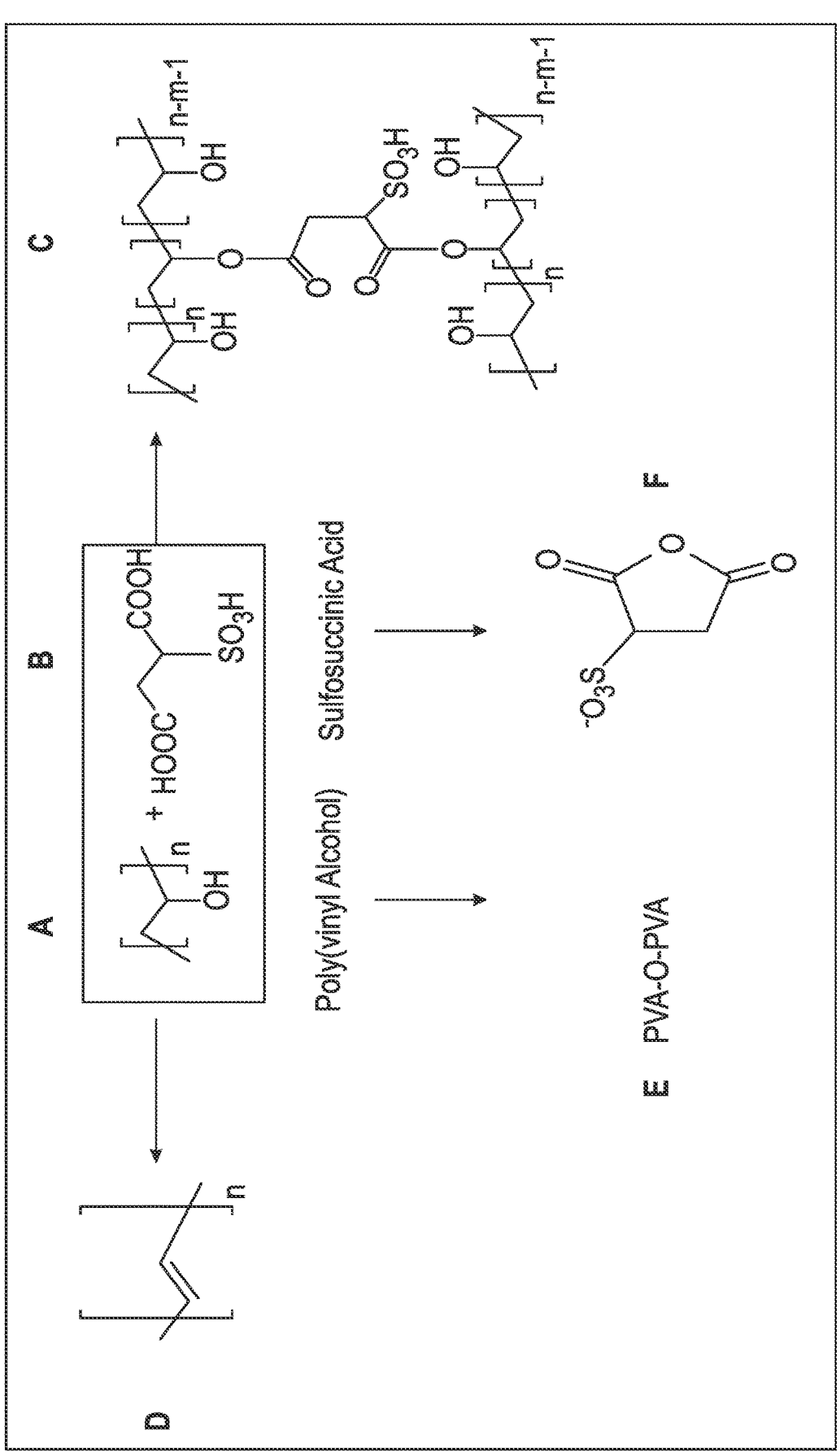
FIG. 7 illustrates chemical reactions in an interferent rejection layer of an analyte sensor, in accordance with one or more aspects.

With reference also to FIG. 7, the IRM layer 620 includes two main components, which are polyvinyl alcohol ("PVA", "component A") and sulfosuccinic acid ("SSA", "component B"). PVA and SSA chemically react to produce PVA/SSA crosslinked polymers ("component C"), each of which includes a sulfonate group. As a result, the PVA/SSA crosslinked polymers have many sulfonate groups, which cause the IRM layer 620 to be negatively charged. A negatively charged IRM layer can potentially help repel negatively charged species in addition to being electrostatically bounded to the HDA layer, thereby further reinforcing the synergistic effect of both layers. The sulfonate group in the acid form functions as a catalyst for the formation of the third species. Also as shown in FIG. 7, PVA and SSA do not only produce PVA/SSA crosslinked polymer, but also produce other components designated herein as D, E, and F. Component F was formed in equilibrium with SSA and can be reverted to its acid form (SSA). Since components D and E do not have the sulfonate groups, production of them is not desirable in the IRM layer 620. To reduce production of components D, E, and F and to improve production of component C, configurable conditions are provided during curing process with PVA and SSA. The configurable conditions may include a thickness of the IRM layer 620, a curing temperature, a curing time duration, and a ratio between quantities of PVA and SSA. The configurable thickness of the IRM layer 620 may range from 0.1 μm and 10 μm and may preferably range from 1 μm to 4 μm; the configurable curing temperature may be from 150° C. to 170° C.; the configurable curing time duration may be from 20 minutes to 60 minutes; and the configurable ratio between quantities SSA and PVA (shown as SSA:PVA) may be less than 160:1 and may preferably be from 70:1 to 110:1. As used herein, the notation SSA:PVA is a molar ratio between SSA and PVA, where one PVA polymer chain is fabricated to have an average weight of 67 kDa and is considered to be one molecule.

The illustrated components in FIG. 7 are merely examples. In aspects, component A may be various PVA derivatives and component B may be a bi-functional carboxylic acid with a pendant negatively charged functional group. In-vivo interferent rejection ability of the analyte sensor may be dependent upon the amount of production of component C, i.e., PVA/SSA crosslinked polymers.

In aspects, the analyte sensor may have another working electrode that is not covered by the IRM layer 620. By comparing signals from the working electrode having the IRM layer 620 with another working electrode not having the IRM layer 620, signals caused by interfering agents (such as drugs like acetaminophen) can be detected to better assess patient physiology and for other purposes, such as, for example, to track patient compliance in taking certain drugs.

The enzyme layer 630 may include an enzyme capable of producing and/or utilizing oxygen and/or hydrogen peroxide, such as, for example enzyme glucose oxidase. In an aspect, an oxidoreductase enzyme such as glucose oxidase in the enzyme layer 630 reacts with glucose to produce hydrogen peroxide, which is a compound that modulates a current at an electrode. Because this modulation of current depends on the concentration of hydrogen peroxide, and the concentration of hydrogen peroxide correlates to the concentration of glucose, the concentration of glucose may be determined by monitoring this modulation in the current. In an aspect, the hydrogen peroxide is oxidized at a working electrode and the resulting current is proportional to the hydrogen peroxide concentration. Modulations in the current caused by changing hydrogen peroxide concentrations may be monitored by the analyte sensor.

As shown in FIG. 6, a high density adhesion ("HDA") layer 640 is disposed or coated directly on top of the enzyme layer 630. The HDA layer 640 includes polymers that have a plurality of repeating amine groups (e.g., poly-L-lysine polymers). Each of the plurality of repeating amine groups in the HDA layer 640 may include amine groups ($-NH_2$), which are positively charged. Thus, the HDA layer 640 is also positively charged. At physiological pH, glucose oxidase is negatively charged and hence, a HDA with plurality of positive charged amine groups confers additionally stability as well as additional hydrogen bonding and Van de Waals forces to help adhere the chemistry stack together. The plurality of repeating amine groups is not limited to poly-L-lysine polymers but can be any other repeating amine group that includes groups and that is positively charged.

In aspects, the poly-L-lysine in the HDA layer 640 may have molecular weights between 30 kilo Dalton ("kDa") and 300 KDa. In aspects, the molecular weights are between 150 kDa and 300 kDa. Typically, the poly-L-lysine in the HDA layer 640 is in amounts from 0.1 weight-to-weight percent ("w/w %") to 0.5 w/w %. The HDA layer 640 may be from 0.1 μm to 5 μm thick and is preferably from 1 μm to 4 μm. These thin HDA layers 640 may have unexpected advantages in that the HDA layer 640 exhibits a lower oxygen response as well as faster hydration times compared to conventional sensors not having these thin HDA layers.

As shown in FIG. 6, an outer sensing membrane layer 650 is disposed on top of the HDA layer 640. The outer sensing membrane layer 650 may be a glucose limiting membrane ("GLM") layer, which may operate to prevent or restrict the diffusion of one or more analytes, such as glucose, through the GLM layer. At the same time, the outer sensing membrane layer 650 may allow or facilitate diffusion of other types of molecules (e.g., $O_2$) therethrough.

When the analyte sensor is attached to the body of a user, the early wear in-vivo run-in problems occur during the initial period (e.g., about 1-4 days) when the sensor values are not stable. By modulating the thickness of the IRM layer 620, the thickness of the HDA layer 640, the ratio SSA:PVA, the cure temperature, and/or cure time duration, early wear in-vivo glucose sensitivity run-in problems can be identified. TABLE 1 shows nine groups of parameter configurations (without modulating the thickness of the had layer 640):

TABLE 1

| Group | Thickness of IRM Layer (μm) | SSA:PVA (X:1) | Cure Temperature (° C.) | Cure time duration (minutes) |
|---|---|---|---|---|
| Group 1 | 2 | 80 | 150 | 20 |
| Group 2 | 4 | 80 | 150 | 50 |
| Group 3 | 2 | 90 | 150 | 50 |
| Group 4 | 4 | 90 | 150 | 20 |
| Group 5 | 2 | 80 | 170 | 50 |
| Group 6 | 4 | 80 | 170 | 20 |

TABLE 1-continued

| Group | Thickness of IRM Layer (μm) | SSA:PVA (X:1) | Cure Temperature (° C.) | Cure time duration (minutes) |
|---|---|---|---|---|
| Group 7 | 2 | 90 | 170 | 20 |
| Group 8 | 4 | 90 | 170 | 50 |
| Group 9 | 3 | 85 | 160 | 35 |

Figure 8:
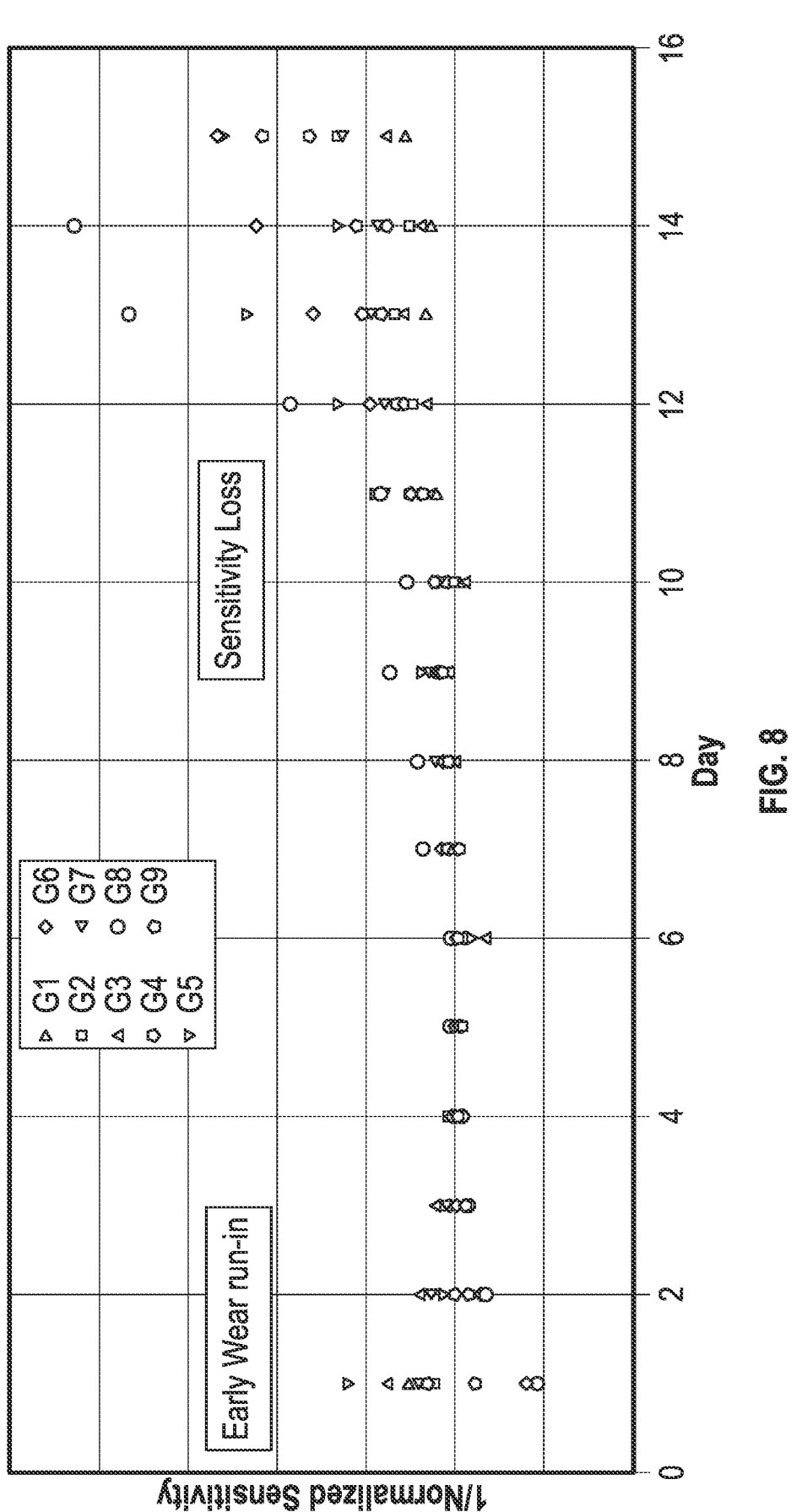
FIG. 8 illustrates graphical representations of data points of nine sensors having design configurations, in accordance with one or more aspects.

For the nine groups of parameter configurations, data from each sensor is collected and plotted to identify early wear run-in problems and sensitivity loss problems. FIG. 8 illustrates a graphical representation of the data from the nine groups based on sensitivity. Sensitivity is calculated by a slope in a graph in which the x-axis represents sensor current signal values and the y-axis represents known BG values. In the graph of FIG. 8, the vertical axis represents the reciprocals of the normalized sensitivity and the horizontal axis represents passage of time in unit of day, with the assumption that the lifetime of the analyte sensors is 15 days. Normalization is described below. The data points may be collected in in-vitro tests using the same concentration of analyte (e.g., glucose) for the lifetime of the analyte sensors. Since analyte sensors need time to provide stable measurement values, the mean measurement value from a reference period (e.g., Days 3-6) in each test may be chosen as a reference value for that test. Such a mean is merely an example and any other period that is sufficient to provide stable signals may be chosen as a reference value.

Using the reference value, measurement values in a test may be normalized in various ways. For example, for each test in FIG. 8, sensitivities are normalized with respect to a reference sensitivity value, which may be mean sensitivity value from a reference period (e.g., Days 3-6). The reciprocal of the normalized sensitivity can then be obtained and plotted, as shown in FIG. 8.

As shown in FIG. 8, data points from Day 1 are generally farther away data points during the reference period (e.g., Days 3-6), indicating that the signals from Day 1 (in any of the nine analyte sensor configurations) are unstable. This phenomenon is the early wear run-in problem. Also as shown in FIG. 8, data from days 12-15 have deviated from the values from the reference period (e.g., Days 3-6), indicating that the measurements of the nine sensor configurations have deviated from the true glucose value in the in-vitro tests. This phenomenon is the sensitivity loss problem, which happens close to the end of the lifetime of the analyte sensors.

Figure 9A:
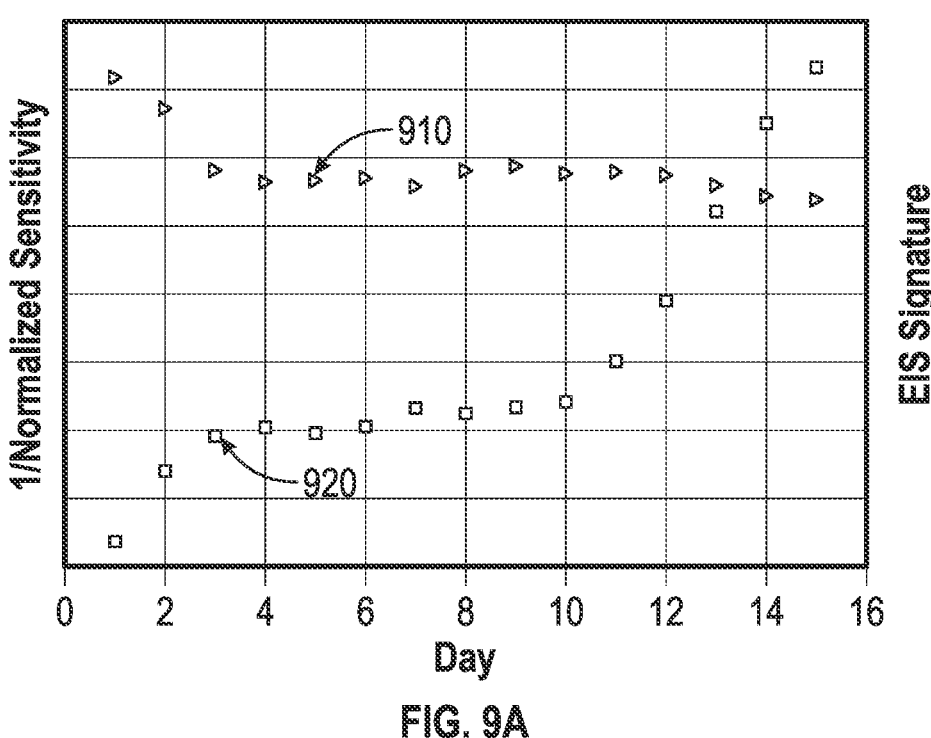
FIG. 9A illustrates graphical representations of data points of an analyte sensor having a first configuration, in accordance with one or more aspects.
Figure 9B:
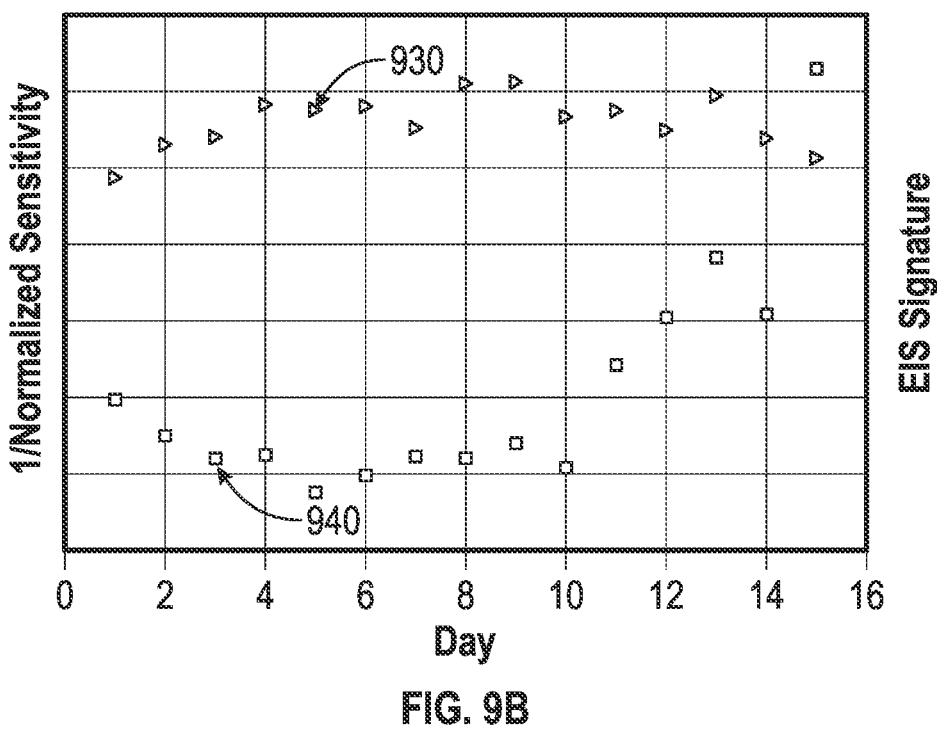
FIG. 9B illustrates graphical representations of data points of an analyte sensor having a second configuration, in accordance with one or more aspects.

FIGS. 9A and 9B show four trends 910-940 of data points. For example, trends 910 and 920 in FIG. 9A are from Group 6, and trends 930 and 940 in FIG. 9B are from Group 2. Points 920 and 940 for Groups 6 and 4, respectively, are the reciprocal normalized sensitivity values from FIG. 8. The points 910 and 930 represent EIS signature values, which are described below. The left vertical axis of FIGS. 9A and 9B represents the reciprocals of the normalized sensitivity, and the right vertical axis of FIGS. 9A and 9B represents EIS signature values. The horizontal axis of FIGS. 9A and 9B represents passage of time in days.

Referring again to FIG. 5, the microcontroller 410 receives an EIS signal from one or more working electrodes of the analyte sensor 355. As persons skilled in the art will understand, an EIS signal includes, without limitation, a complex impedance $Z_{\omega,t}$. As mentioned in connection with FIG. 5, the microcontroller 410 may calculate real impedance ($Z_{\omega,t,real}$) and imaginary impedance ($Z_{\omega,t,imag}$) of the EIS signal. The EIS signature value for a time t and an angular frequency ω may be denoted as EIS signature value (ω, t) and may be calculated based on a dielectric property of the IRM layer. In embodiments, the dielectric property may be a universal dielectric response, which may characterize dielectric behavior of a material under AC conditions. In embodiments, the dielectric behavior may be characterized based on admittance, which is the reciprocal of the complex impedance, which is an EIS signal as described above. Persons skilled in the art will understand how to determine dielectric property of materials using EIS. For convenience, in the following description, EIS signature value (ω, t) may simply be referred to as EIS signature value.

Points 910 and 930 of EIS signature values are plotted over the lifetime of the analyte sensors in FIGS. 9A and 9B. Relatively larger changes in reciprocal normalized sensitivity 920, 940 can be seen during the initial period (e.g., days 1-4), whereas relatively smaller changes can be seen during the stabilized period (e.g., days 5-10). Likewise, relatively larger changes in EIS signature 910, 930 can be seen during the initial period, whereas relatively smaller changes can be seen during the stabilized period (e.g., days 5-10). As the data reflects, the EIS signature values during the early wear period of the sensor are correlated with sensor sensitivity. Accordingly, EIS signature values may be used in place of sensitivity values during the early wear period and may be used to correct for sensor sensitivity during the early wear period, which will be described in more detail in connection with FIG. 18. Thus, early wear run-in problem during the initial period may be identified by monitoring the EIS signature values. Particularly, by comparing the EIS signature values during the early wear period (e.g., Days 1-4) to a reference value (e.g., a predetermined average EIS signature value during the stabilized period), early wear run-in problems can be identified, and the EIS signature value may be used to adjust or compensate sensor values in-vivo, which will be described in connection with FIG. 18.

In FIG. 9, each EIS signature values is an average value during a day, but other embodiments are contemplated, such as one EIS signature value per hour, etc. The reference value described above (e.g., average EIS signature value during the stabilized period) may be a predetermined value that is based on the design configuration of the analyte sensor.

By calculating a difference between the reference value and the EIS signature values during the initial period (e.g., Days 1-4) and comparing the difference with a predetermined threshold, the early wear run-in problem can be identified. The value of the predetermined threshold may depend on the parameter configuration of the analyte sensor.

Figure 10A:
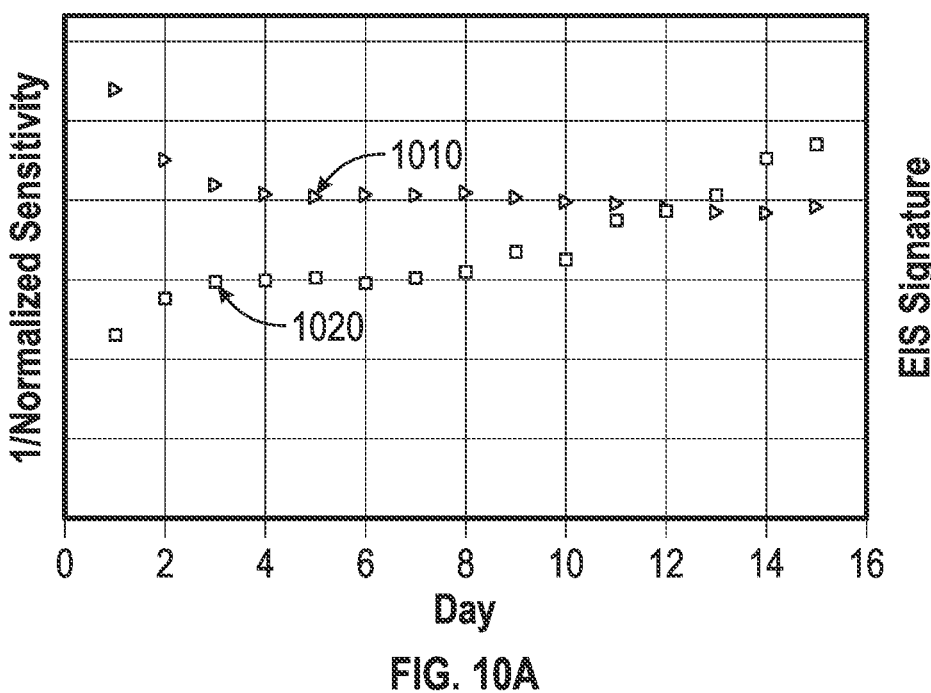
FIG. 10A illustrates graphical representations of data points of an analyte sensor having a third configuration, in accordance with one or more aspects.
Figure 10B:
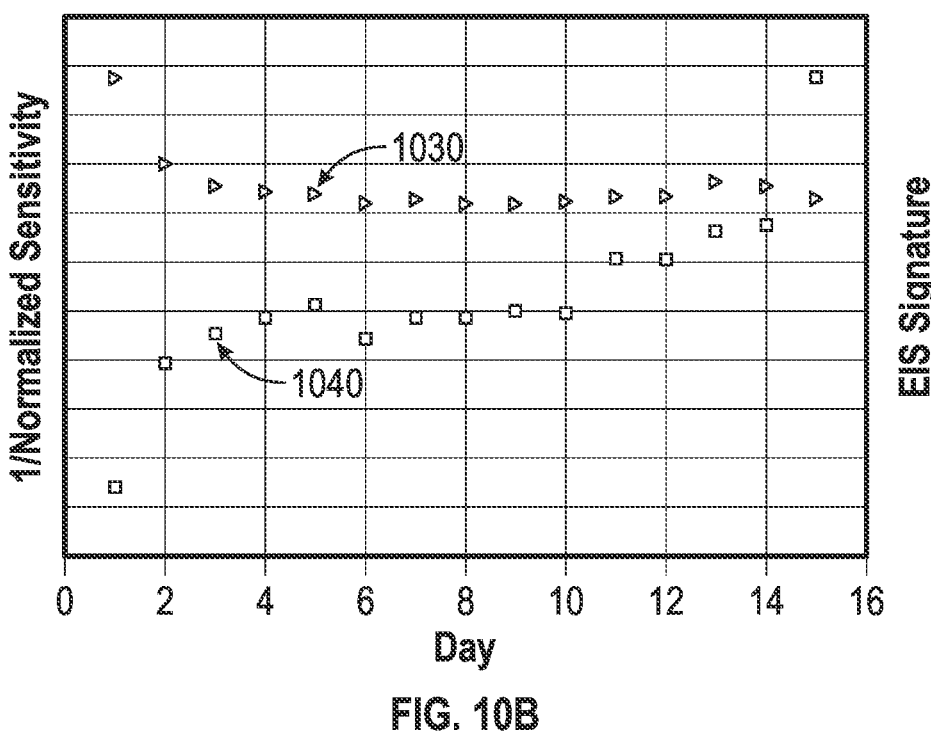
FIG. 10B illustrates graphical representations of data points of an analyte sensor having a fourth configuration, in accordance with one or more aspects.

In aspects, the thickness of the HDA layer may be modulated. FIGS. 10A and 10B illustrate trends 1010-1040 of data points corresponding to analyte sensors having different thicknesses in the HDA layer. In particular, the trends 1010 and 1020 in FIG. 10A correspond to an analyte sensor having a lower thickness (e.g., 0.2-0.5 μm) in the HDA layer, and the trends 1030 and 1040 in FIG. 10B correspond to an analyte sensor with a higher thickness (e.g., 0.5-1.5 μm) in the HDA layer. Points 1020 and 1040 are reciprocal normalized sensitivity values. The points 1010 and 1030 represent EIS signature values, which are described below. The left vertical axis of FIGS. 10A and 10B represents the reciprocals of the normalized sensitivity, and the right vertical axis of FIGS. 10A and 10B represents EIS signature values. The horizontal axis of FIGS. 10A and 10B represents passage of time in days.

Trends 1020 and 1040 show relatively larger changes in reciprocal normalized sensitivity during the initial period (e.g., days 1-4) compared to changes during the stabilized period (e.g., days 5-10). Likewise, trends 1010 and 1030 show relatively larger changes in EIS signature during the initial period compared to the stabilized period (e.g., days 5-10). Thus, early wear run-in problem during the initial period may be identified by monitoring the EIS signature values for different thicknesses of the HDA layer of the analyte sensor.

Figure 11:
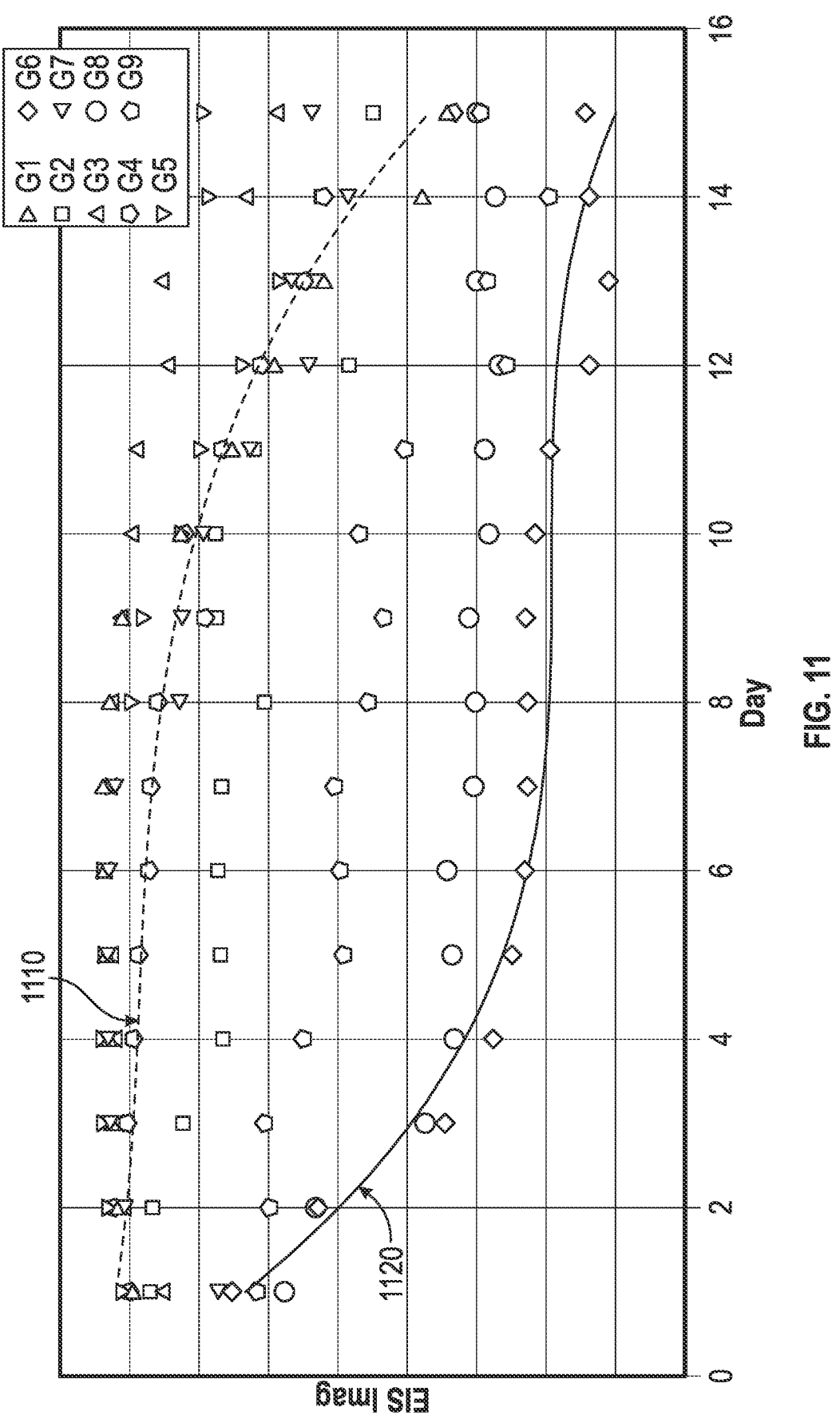
FIG. 11 illustrates graphical representations of data points of electrochemical impedance spectroscopy ("EIS") imaginary impedances at working electrodes of the nine analyte sensors of FIG. 8, in accordance with one or more aspects.

FIG. 11 illustrates trends of EIS imaginary impedance of the nine groups, which were described above, during the lifetime of the nine analyte sensors in accordance with aspects of the present disclosures. When an electrochemical impedance spectroscopy ("EIS") signal is produced by one or more working electrodes of the analyte sensor, a microcontroller of the analyte sensor may receive the EIS signal and calculate real impedance ($Z_{real}$) and imaginary impedance ($Z_{imag}$) of the EIS signal at a predetermined frequency, which may be a frequency in the range of 1 millihertz to 10 kHz. In particular, the imaginary impedance is related to the state of the IRM layer of the analyte sensor. The state of the IRM layer may include a hydration profile of the IRM layer. In particular, a level of hydration affects the capacitance properties of the layers. Specifically, the hydration in the IRM layer affects the capacitive reactance, which is related to the imaginary impedance. As such, the vertical axis of FIG. 11 represents the EIS imaginary impedance, and the horizontal axis represents the passage of time during the lifetime of the analyte sensor.

For example, the EIS imaginary impedance of Group 4 is shown in the trend 1110 and the EIS imaginary impedance of Group 6 is shown in the trend 1120. The trend 1110 shows relatively smaller changes in the EIS imaginary impedance during the initial period (e.g., Days 1-4), while the trend 1120 shows relatively larger changes during the initial period. In contrast, the trend 1110 shows relatively larger changes during the ending period (e.g., Days 11-15), while the trend 1120 shows relatively smaller changes during the ending period. Both trends show relatively smaller changes during the stabilized period (e.g., Days 5-10).

Figure 12:
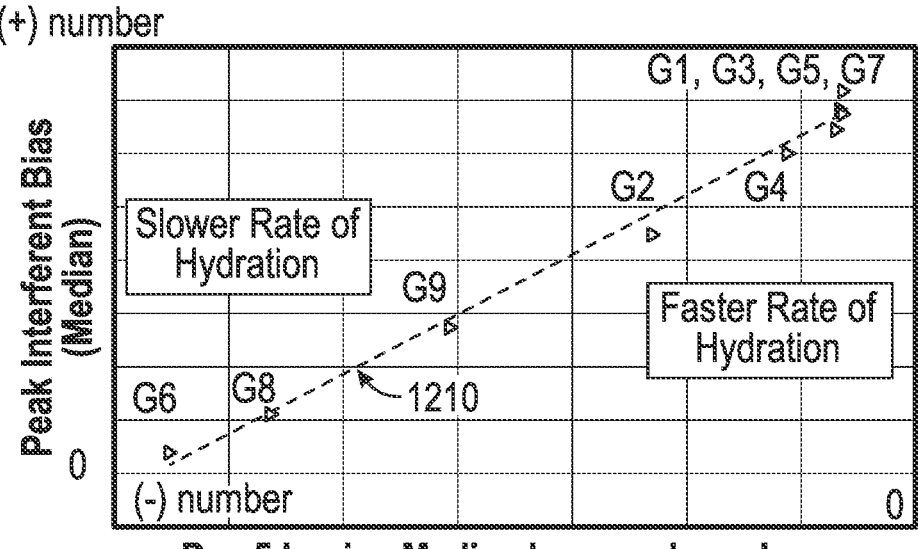
FIG. 12 illustrates graphical representations of a relationship between peak interferent biases and median EIS imaginary impedances of the nine groups of analyte sensors of FIG. 8, in accordance with one or more aspects.

FIG. 12 illustrates a relationship 1210 between peak interferent biases and median imaginary impedances of the nine groups in accordance with aspects of the present disclosure. The vertical axis represents the peak interferent bias in unit of mg/dL and the horizontal axis represents median EIS imaginary impedance in unit of ohm at Day 5 in-vivo. The peak interferent bias may be calculated by the difference between the maximum prior to introduction of the interferent drug (e.g., acetaminophen) and the median value after the introduction of the drug. In other words, the peak interferent bias represents the effect of the interferent drug.

As shown, Groups 6 and 8 are positioned at the lower left, Groups 1, 3, 5, and 7 are positioned at the upper right, Groups 2 and 4 are positioned close to the upper right, and Group 9 is in between the lower left and Groups 2 and 4. Because the hydration in the IRM layer affects the EIS imaginary impedance, a lower EIS imaginary impedance corresponds to a slower rate of hydration in the IRM layer. As such, Groups 6 and 8 have a slower rate of hydration, while Groups 1, 3, 5, and 7 have a faster rate of hydration in the IRM layer.

Further, the slower rate of hydration is related to higher negative charges within the IRM layer, meaning that the component C (e.g., PVA/SSA crosslinked polymers) of FIG. 7 is produced more than the components D and E. In other words, more favorable conditions are provided during the curing process of the components A and B (e.g., PVA and SSA). On the other hand, the faster rate of hydration implies lower negative charges within the IRM layer, meaning that the component C of FIG. 7 is produced less than the components D, E, and F.

In another aspect, based on the median imaginary impedance value, the configuration of the analyte sensor may be detected. For example, when the EIS imaginary impedance at Day 5 is less than −5000Ω, the configuration of the analyte sensor may be detected as the thickness of the IRM layer being about 4 μm, the ratio SSA:PVA being about 80:1 or 90:1, the curing temperature being about 170° C., and the curing time being about 20 or 50 minutes. Further, when the EIS imaginary impedance at Day 5 is less than −5,000Ω, it is determined that the in-vivo interferent rejection ability is better than analyte sensors whose EIS imaginary impedance at Day 5 is greater than −5,000Ω.

Figures 13A, 13B, 13C:
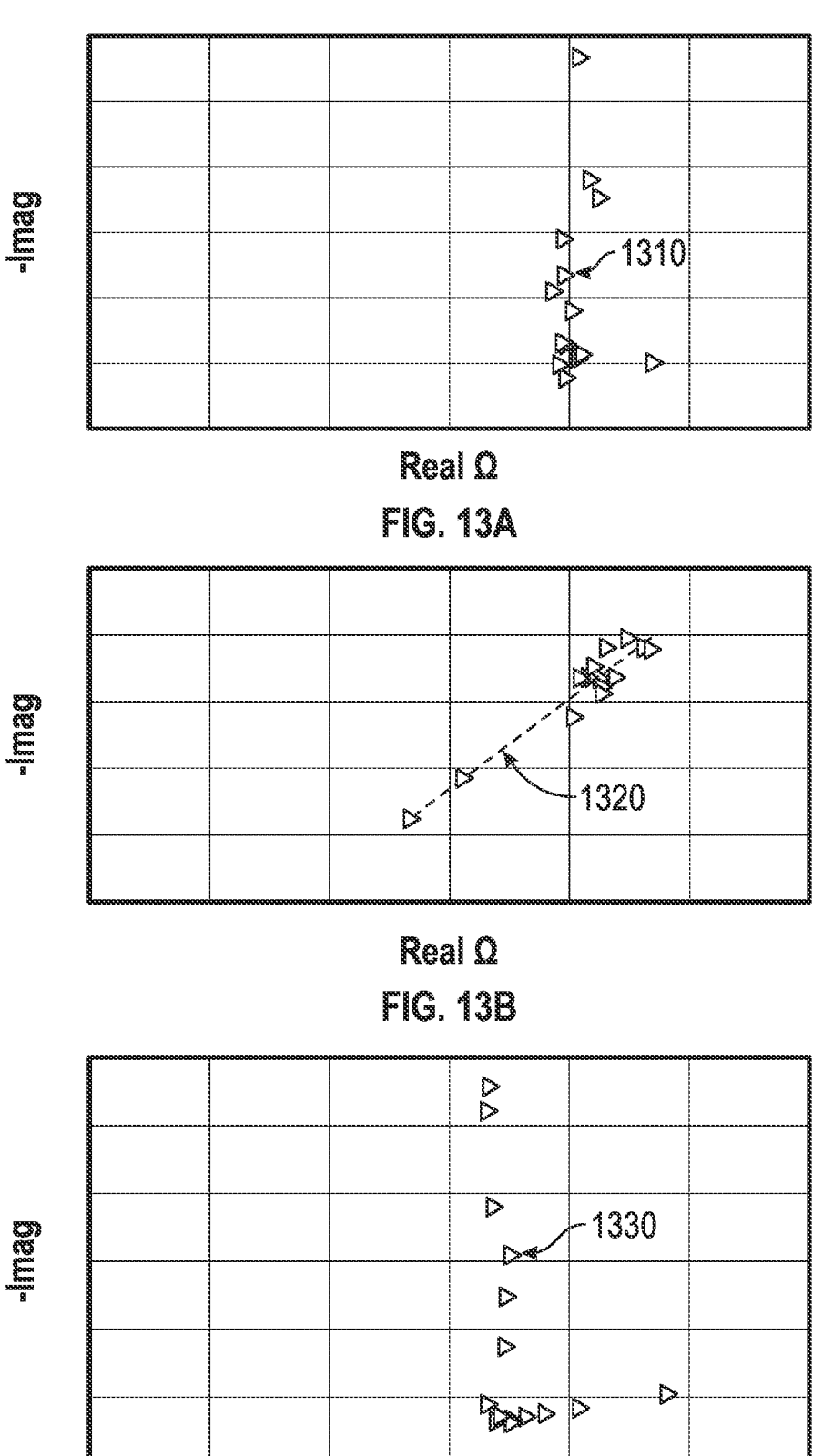
FIG. 13A illustrates graphical representations of a plot of a full hydration profile of analyte sensors of FIG. 8, in accordance with one or more aspects.
FIG. 13B illustrates graphical representations of a plot of a limited hydration profile of analyte sensors of FIG. 8, in accordance with one or more aspects.
FIG. 13C illustrates graphical representations of a plot of a partial hydration profile of analyte sensors of FIG. 8, in accordance with one or more aspects.

Hydration profiles may be determined based on plots of the analyte sensor impedance characteristics over time. FIGS. 13A-13C show three hydration profiles based on the impedance data over the lifetime of various analyte sensors in accordance with aspects of the present disclosure. In FIGS. 13A-13C, the horizontal axes represent EIS real impedance in ohms, and the vertical axes represent EIS imaginary impedance in ohms. Each data point corresponds to a coordinate (real impedance value, imaginary impedance value) for a particular day. For example, in FIG. 13A, the data point for Day 1 is plotted at the top and the other data points, e.g., for Days 2-15, are plotted under the data point for Day 1. Similarly, data points over a sensor lifetime (e.g., Days 1-15) are plotted in FIGS. 13B and 13C.

Each data point (real impedance value, imaginary impedance value) is determined based on the median impedance over a day. For example, during Day 1, the analyte sensor may perform multiple EIS procedures and may record impedance values determined during each EIS procedure. Each EIS procedure may apply a particular frequency or a range of frequencies based on the layer of interest in the analyte sensor. For the IRM layer, the EIS procedures may apply a frequency of 0.1 Hz. Each impedance value $Z_{\omega,t} = Z_{\omega,t,real} + j\,Z_{\omega,t,imag}$ corresponds to a particular EIS procedure performed at time t using frequency $f = \omega/2\pi$. In aspects, the median impedance for a day is determined as the median real impedance value of all recorded real impedance values for the day and the median complex impedance value of all recorded complex impedance values for the day. Thus, for Day 1, the data point would have an x-axis value that is the median real impedance for Day 1 and a y-axis value that is the median complex impedance for Day 1. Other ways of determining median impedance are contemplated to be within the scope of the present disclosure.

In FIGS. 13A-13C, the data points reflect the state of the IRM layer over a sensor's lifetime. Some days have similar y-axis values, which suggests that the state of the IRM layer did not change significantly over those days. Other days have different y-axis frequencies, which suggests that the state of the IRM layer did change significantly over such days. With respect to hydration profiles, FIG. 13A shows a full hydration profile 1310, FIG. 13B shows a limited hydration profile 1320, and FIG. 13C shows a partial hydration profile 1330. In testing, and referring to Table 1, groups 1, 3, 5, and 7 show a full hydration profile 1310, groups 6 and 8 show a limited hydration profile 1320, and group 2 and 4 show a partial hydration profile 1330. Since Groups 6 and 8 show good interferent rejection abilities, the limited hydration profile 1320 may be preferred in the design phase for analyte sensors.

Figure 14A:
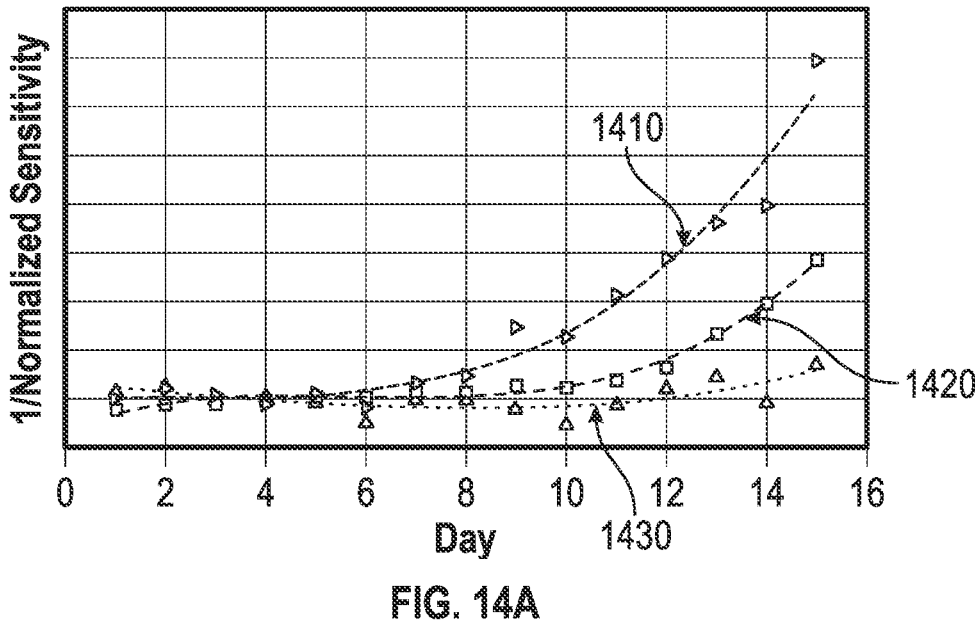
FIG. 14A illustrates graphical representations of changes in reciprocals of normalized sensitivity of three analyte sensors, in accordance with one or more aspects.
Figure 14B:
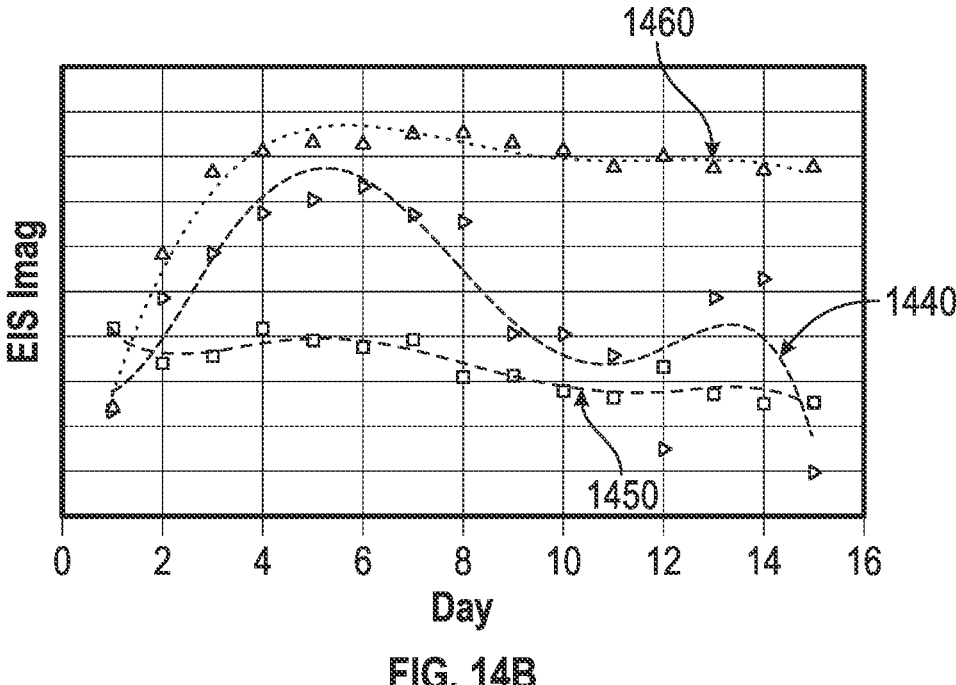
FIG. 14B illustrates graphical representations of changes in EIS imaginary impedances at working electrodes of the three analyte sensors of FIG. 14A, in accordance with one or more aspects.

FIG. 14A illustrates three trends 1410, 1420, and 1430 of the reciprocal of normalized sensitivities of Groups 1, 2, and 3, respectively, from FIG. 8. FIG. 14B illustrates corresponding trends 1440, 1450, and 1460 of EIS impedances of Groups 1, 2, and 3 from FIG. 11. Based on deviation from the horizontal axis of FIG. 14A, Groups 2 and 3 show smaller sensitivity loss in the ending period (e.g., Days 11-15) than Group 1. Group 1 shows steady EIS imaginary impedance in the ending period, while Groups 2 and 3 show more negative EIS imaginary impedance than those of Group 1. Thus, the sensitivity loss in the ending period may be identified based on the EIS imaginary impedance. Further, based on TABLE 1 above, in the design phase, with the same curing temperature, the higher curing time (e.g., 50 minutes) is preferred and lowers the sensitivity loss to improve sensor in-vivo longevity in the ending period.

Figures 15A, 15B:
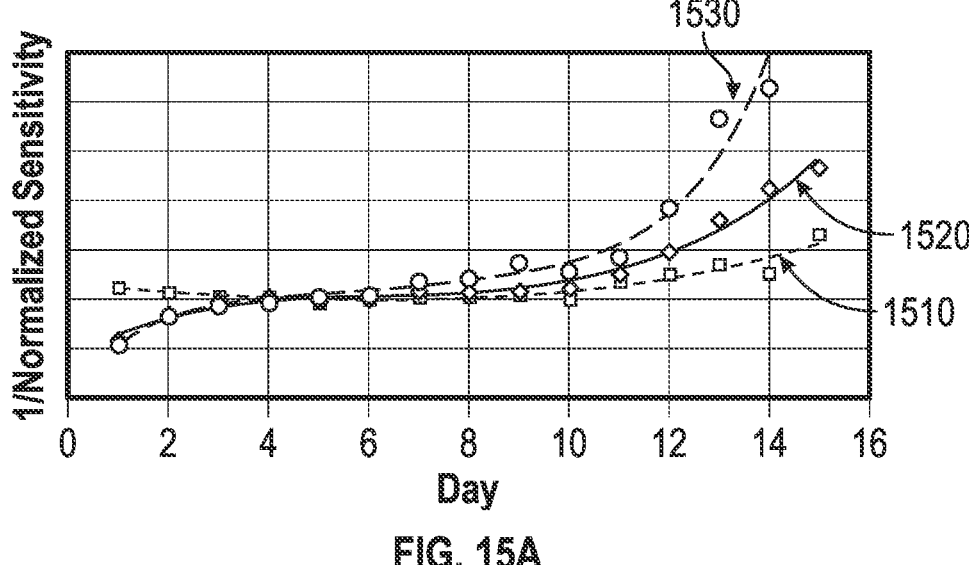
FIG. 15A illustrates graphical representations of changes in reciprocals of normalized sensitivity of three analyte sensors of FIG. 8, in accordance with one or more aspects.
FIG. 15B illustrates graphical representations of changes in EIS imaginary impedances at working electrodes of the three analyte sensors of FIG. 15A, in accordance with one or more aspects.

FIG. 15A illustrates three trends 1510, 1520, and 1530 of the reciprocal of normalized sensitivities of Groups 2, 6, and 8, respectively, from FIG. 8. FIG. 15B illustrates corresponding trends 1540, 1550, and 1560 of EIS impedances of Groups 2, 6, and 8 from FIG. 11. Based on deviation from the horizontal axis of FIG. 15A, Groups 6 and 8 show smaller sensitivity loss in the ending period (e.g., Days 11-15) than Group 2. Group 2 shows relatively steady EIS imaginary impedance in the ending period, while Groups 6 and 8 show more negative EIS imaginary impedance than those of Group 2. Thus, the sensitivity loss in the ending period may be identified based on the EIS imaginary impedance. Further, based on TABLE 1 above, in the design phase, with the same thickness in the IRM layer, the higher curing temperature (e.g., 170° C.) and the larger ratio (e.g., 90:1) of SSA:PVA are preferred to lower the sensitivity loss or to improve sensor in-vivo longevity in the ending period.

In addition to modulations of the thickness of the IRM, the thickness of the HDA layer can be modulated. With the same thickness of the IRM layer, the same ratio between the two components in the IRM layer, and the same curing temperature, the thickness of the HDA layer and the thickness of the outer sensing membrane are modulated in in-vitro tests, as set forth in TABLE 2.

TABLE 2

| Group | Thickness of HDA Layer | Thickness of Outer Sensing Membrane Layer |
|---|---|---|
| A | 2X | Low |
| B | 3X | Low |
| C | 1X | High with voltage difference |
| D | 1X | High |

The second column under the thickness of the HDA layer specifies a number of coatings. For example, if X coating(s) is 2 μm thick, "3×" means three times the coatings and a total thickness of 6 μm.

Figure 16A:
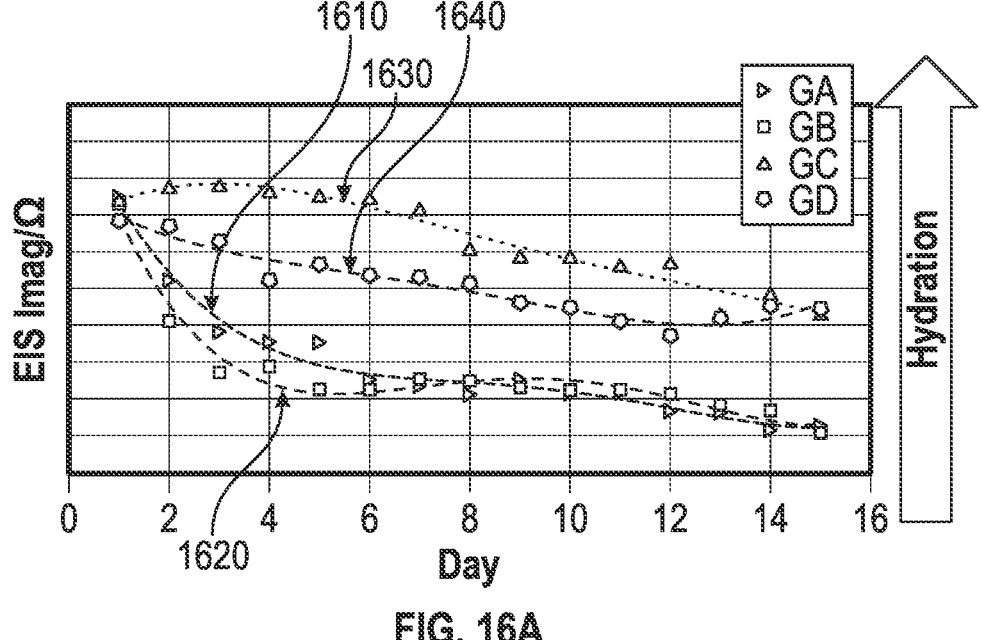
FIG. 16A illustrates graphical representations of changes in EIS imaginary impedances of four analyte sensors, in accordance with one or more aspects.
Figure 16B:
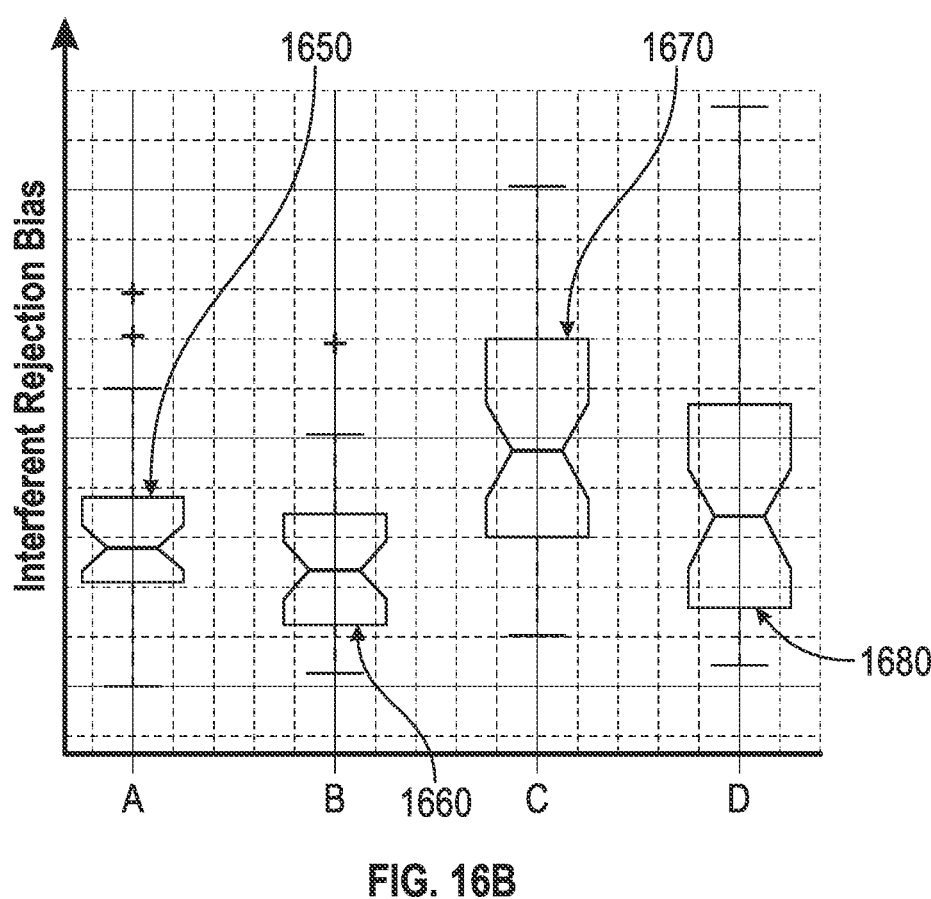
FIG. 16B illustrates graphical representations of interferent rejection biases from the four analyte sensors of FIG. 16A, in accordance with one or more aspects.
Figure 16C:
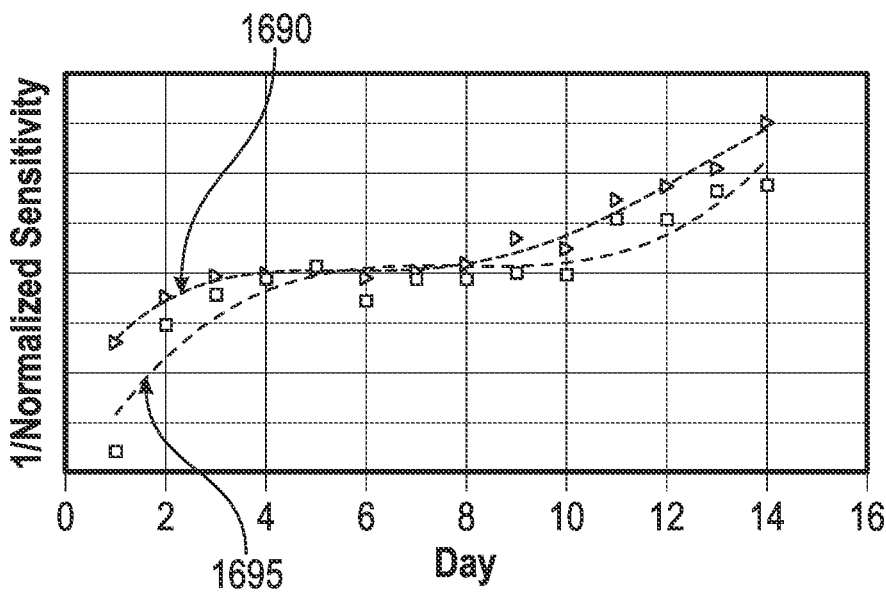
FIG. 16C illustrates graphical representations of changes in reciprocals of normalized sensitivity of two of the four analyte sensors of FIG. 16A, in accordance with one or more aspects.

FIGS. 16A-16C show data from the four groups of analyte sensors in accordance with aspects of the present disclosure. In particular, FIG. 16A illustrates trends of data points of Groups A-D of TABLE 2. The vertical axis represents EIS imaginary impedance in Ω and the horizontal axis represents passage of time in days. Data points from Groups A-D show translations from differences in thickness of the HDA layer to differences in the EIS imaginary impedance. For the arrow in the right side, smaller absolute value of the EIS imaginary impedance corresponds to more hydration and lower sensitivity loss.

In particular, trends 1610 and 1620 are from Groups A and B, respectively, and trends 1630 and 1640 are from Groups C and D, respectively. Based on the trends 1630 and 1640, the EIS imaginary impedances of Groups C and D vary relatively smaller from low impedance to high impedance along the lifetime of the analyte sensors compared to the changes in the EIS imaginary impedance of Groups A and B based on the trends 1610 and 1620.

Now referring back to FIGS. 13A-13C, small changes of the trends 1630 and 1640 are similar to FIGS. 13A and 13B, meaning that Groups C and D fall in the full hydration or the partial hydration. That means that Groups C and D may not have good interferent rejection abilities.

On the other hand, as the trends 1610 and 1620 show relatively larger changes in the EIS imaginary impedance, Groups A and B fall in the limited hydration of FIG. 13B. That means Groups A and B do have good interferent rejection abilities. FIG. 16B illustrates interferent rejection bias of Groups A-D in notched box plots 1650-1680. As shown in FIG. 13B, the interferent rejection biases of Groups A and B based on the notched box plots 1650 and 1660 are better than those of Groups C and D based on the notched box plots 1670 and 1680.

FIG. 16C illustrates trends 1690 and 1695 in reciprocals of normalized sensitivity of Groups A and B in accordance with aspects of the present disclosure. Based on the reciprocal of the normalized sensitivity in the ending period of the lifetime of the analyte sensors, the trend 1690 of Group A shows bigger loss of sensitivity than the trend 1695 of Group B, as evidenced in the notched box plots 1650 and 1660 of FIG. 16B. In other words, three coatings of the HDA layer are better for sensor longevity than two coatings of the HDA layer.

As shown in FIGS. 8-16C, various design configurations translate to differences in EIS real and imaginary impedances, to differences in in-vivo interferent rejection abilities, and to differences in in-vivo longevity. Thus, by employing optimum design configurations of the IRM and HDA layers and above-described conditions to analyte sensors, the interferent rejection abilities and sensor longevity of the analyte sensors can be improved.

FIG. 17 shows a flowchart of a method 1700 for manufacturing an analyte sensor in accordance with aspects of the present disclosure. The manufactured analyte sensor may substantially address the early wear run-in problems and improve sensitivity loss near the lifetime of the analyte sensor. The method 1700 begins by providing a base layer for supporting the analyte sensor to be manufactured in step 1710.

In step 1720, a conductive layer is disposed or formed on the base layer. The conductive layer may include a working electrode and other electrodes (e.g., another working electrode, a counter electrode, a reference electrode, etc.). The working electrode is to provide a current signal depending on the concentration level of glucose. For counter, reference, and working electrodes areas, an insulation layer can be fabricated to only have metal layer exposed to chemistry layers on the counter, reference, and working electrodes areas. For working and counter electrodes, a catalyst layer (Pt) can be fabricated on the working and counter electrodes.

In step 1730, an interference rejection membrane ("IRM") layer is formed on the working electrode. The IRM layer may include two components (e.g., polyvinyl alcohol ("PVA") and sulfosuccinic acid ("SSA"), which are cured to produce PVA/SSA crosslinked polymers. The IRM layer may be negatively charged because the PVA/SSA crosslinked polymer includes sulfonate groups. The negatively charged IRM layer may prevent interferents such as acetaminophen and ascorbic acid from contacting working electrodes in the analyte sensor and generating spurious electronic signals that do not reflect the presence of the analyte (e.g., glucose).

Under undesired curing conditions, however, the two compounds produce other species, which do not include the sulfonate groups and do not prevent interferents. The desired conditions may include a thickness of the IRM layer, a curing temperature, a curing time duration, and a ratio between PVA and SSA. The desired thickness of the IRM layer 620 may range from 0.1 µm and 10 µm and may preferably range from 1 µm to 4 µm; the desired curing temperature may be from 150° C. to 170° C.; the desired curing time duration may be from 20 minutes to 50 minutes; and the desired ratio SSA:PVA may be less than 160:1 and may preferably be from 70:1 to 110:1. In an aspect, the desired conditions may vary depending on the choice of two compounds, which are configured to produce negatively charged groups.

The analyte sensor may have another working electrode, which is not coated with the IRM layer in step 1730. Thus, by comparing signals from these working electrodes, signals from interfering agents such as excipients (such as acetaminophen) of insulin can be detected to better assess patient physiology and, for example, to track patient compliance in taking certain drugs.

In step 1740, an enzyme layer is formed on the IRM layer. The enzyme layer may include an enzyme capable of producing and/or utilizing oxygen and/or hydrogen peroxide, for example enzyme glucose oxidase. In an aspect, an oxidoreductase enzyme such as glucose oxidase in the enzyme layer reacts with glucose to produce hydrogen peroxide, a compound which then modulates a current at the working electrode. As this modulation of current depends on the concentration of hydrogen peroxide, and the concentration of hydrogen peroxide correlates to the concentration of glucose, the concentration of glucose may be determined by monitoring this modulation in the current. In an aspect, the hydrogen peroxide is oxidized at the working electrode with the resulting current being proportional to the hydrogen peroxide concentration.

Optionally, a high density adhesion ("HDA") layer is formed on the enzyme layer in step 1750. The HDA layer may be directly disposed or coated on the IRM layer. In an aspect, the thickness of the HDA may be determined by a number of coatings of the HDA on the enzyme layer. The HDA layer may include polymers, which have a plurality of repeating amine groups (e.g., poly-L-lysine polymers). Each of the plurality of repeating amine groups in the HDA layer includes two amine groups (e.g., $-NH_2$), which is positively charged. Thus, the HDA layer is also positively charged. The plurality of repeating amine groups is not limited to poly-L-lysine polymers but can be any other repeating amine groups, which include positively charged groups.

By modulating the thicknesses of the IRM layer and the HDA layer, the analyte sensor may have improved IR abilities and longevity. As described above in step 1730, the desired thickness of the IRM layer 620 may range from 0.1 µm and 10 µm and may preferably range from 1 µm to 4 µm, and the desired thickness of the HDA layer may range from 0.1 µm to 5 µm and may preferably range from 1 µm to 4 µm. The effect of the combination of the IRM layer and the HDA layer is greater than the sum of the effect of individual IRM and HDA layers.

In step 1760, an outer sensing layer, such as a glucose limiting membrane ("GLM") layer, is formed on the optional HDA layer (if present). The GLM layer may operate to prevent or restrict the diffusion of one or more analytes, such as glucose, through the GLM layer. The GLM layer may allow or facilitate diffusion of other types of molecules (e.g., $O_2$) through the GLM layer.

Figure 18:
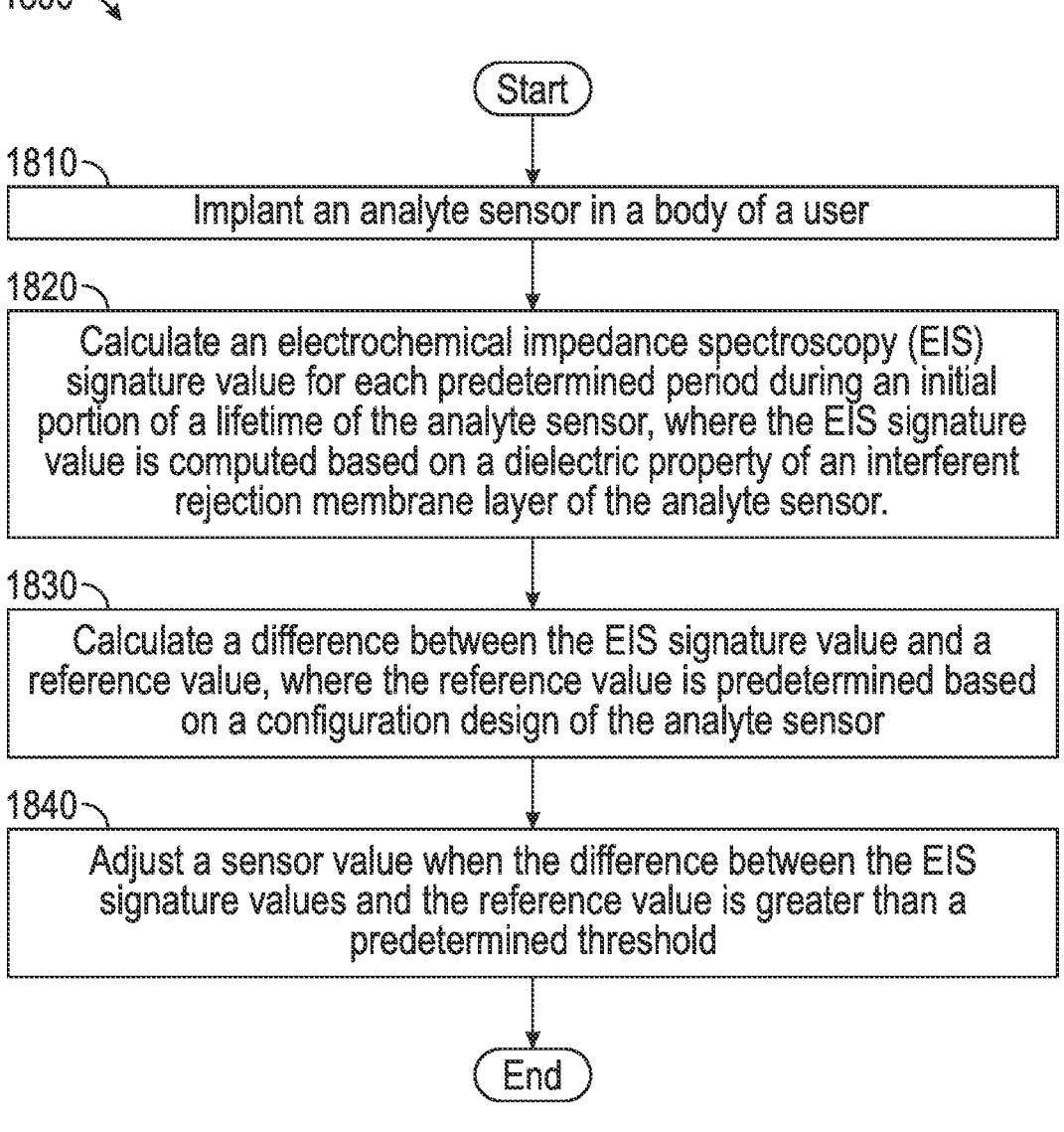
FIG. 18 illustrates a flowchart of a method of adjusting a sensor value when an early wear run-in problem occurs in an analyte sensor, in accordance with one or more aspects.

When the analyte sensor is manufactured in the method 1700, the analyte sensor may be implanted in a body of a user to identify early wear run-in problems and adjust the sensor value to monitor the analyte concentration in the body of the user. FIG. 18 illustrates a flowchart of a method 1800 for adjusting a sensor value when an early wear run-in problem occurs in an analyte sensor.

In step 1810, the analyte sensor is implanted in a body of a user. In step 1820, an electrochemical impedance spectroscopy (EIS) signature value is determined for each predetermined period during an initial portion of a lifetime of the analyte sensor. The EIS signature values are computed based on a dielectric property of an interferent rejection membrane layer of the analyte sensor. In embodiments, each EIS signature value may be an average value for a predetermined period (e.g., a day).

As described above herein, the EIS signature values may be computed based on an EIS signal. A microcontroller of the analyte sensor may receive an electrochemical impedance spectroscopy ("EIS") signal from one or more working electrodes of the analyte sensor and calculate real impedance ($Z_{real}$) and imaginary impedance ($Z_{imag}$) of the EIS signal.

As described above with respect to FIGS. 9A and 9B, the EIS signature value is correlated with the normalized sensitivity during an initial period of the lifetime of the analyte sensor or before the sensor signals are stabilized. Based on the correlation between EIS signature value and the normalized sensitivity, an early wear run-in problems may be identified by comparing the EIS signature value with a reference value in step 1830. The reference value may be predetermined based on the configuration of design of the analyte sensor. For example, the reference value may be a particular value based on FIG. 9A, for the following design: the thickness of the IRM layer is 4 µm, the ratio SSA:PVA is 80:1, the curing temperature is 170° C., and the curing time is 20 minutes; and the reference value may be another value based on FIG. 9B with the following design: the thickness of the IRM layer is 4 µm, the ratio SSA:PVA is 80:1, the curing temperature is 150° C., and the curing time is 50 minutes. These reference values are provided for the explaining purposes only and are not meant to be fixed values to the design configurations. As described, the reference values may vary depending on the design configuration of the analyte sensor and may be predetermined and saved within a memory (which is not shown) of the analyte sensor. In an aspect, the reference value may be the EIS signature value calculated at a day when the sensor signal is stabilized. For example, the reference value may be the mean EIS signature value from, e.g., Days 3-6 during a test period with the design configuration.

In step 1840, a sensor value is adjusted when the difference between the EIS signature value and the reference value is greater than a predetermined threshold. In this way, the early wear run-in problems can be identified, and the sensor signals are adjusted in consideration of the correlation between the EIS signature values and the normalized sensitivity.

It should be understood that various aspects disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (e.g., all described acts or events may not be necessary to carry out the techniques). In addition, while certain aspects of this disclosure are described as being performed by a single module or unit for purposes of clarity, it should be understood that the techniques of this disclosure may be performed by a combination of units or modules associated with, for example, the above-described servers and computing devices.

While the description above refers to particular aspects of the present disclosure, it will be understood that many modifications may be made without departing from the spirit thereof. Additional steps and changes to the order of the algorithms can be made while still performing the key teachings of the present disclosure. Thus, the accompanying claims are intended to cover such modifications as would fall within the true scope and spirit of the present disclosure. The presently disclosed aspects are, therefore, to be considered in all respects as illustrative and not restrictive, the scope of the disclosure being indicated by the appended claims rather than the foregoing description. Unless the context indicates otherwise, any aspect disclosed herein may be combined with any other aspect or aspects disclosed herein. All changes that come within the meaning of, and range of, equivalency of the claims are intended to be embraced therein.

What is claimed is:

1. An analyte sensor comprising:
a microcontroller;
a base layer;
a conductive layer disposed on the base layer, wherein the conductive layer includes a working electrode configured to provide a current signal in presence of glucose;
an interference rejection membrane ("IRM") layer disposed on the working electrode, the IRM layer being negatively charged; and
an enzyme layer disposed on the IRM layer, wherein the enzyme layer includes an enzyme selected to generate a detectable electrical signal upon exposure to the glucose,
wherein the microcontroller is configured to process an electrochemical impedance spectroscopy (EIS) parameter to determine a state of the IRM layer, and
wherein the microcontroller is further configured to determine an EIS signature value based on a dielectric property of the IRM layer.

2. The analyte sensor of claim 1, wherein the EIS parameter is median imaginary impedance, wherein the microcontroller is configured to determine the state of the IRM layer based on the median imaginary impedance.

3. The analyte sensor of claim 1, wherein the microcontroller is further configured to, during an early wear period, adjust an analyte measurement based on the EIS signature value.

4. The analyte sensor of claim 3, wherein, during the early wear period, the analyte measurement is adjusted further based on a reference EIS signature value.

5. The analyte sensor of claim 4, wherein the reference EIS signature value corresponds to a stabilized period that is at least partially after the early wear period.

6. The analyte sensor of claim 1, further comprising a high density adhesion ("HDA") layer disposed on the enzyme layer, the HDA layer being positively charged.

7. A method in an analyte sensor,
the analyte sensor comprising:
a microcontroller;
a base layer for supporting the analyte sensor;

a conductive layer disposed on the base layer, wherein the conductive layer includes a working electrode configured to provide a current signal in presence of glucose;
an interference rejection membrane ("IRM") layer disposed on the working electrode, the IRM layer being negatively charged; and
an enzyme layer disposed on the IRM layer, wherein the enzyme layer includes an enzyme selected to generate a detectable electrical signal upon exposure to the glucose;
the method comprising:
by the microcontroller, processing an electrochemical impedance spectroscopy (EIS) parameter to determine a state of the IRM layer of the analyte sensor, wherein the EIS parameter is median imaginary impedance, and
wherein processing the EIS parameter to determine the state of the IRM layer includes determining the state of the IRM layer based on the median imaginary impedance.

8. The method of claim 7, further comprising, by the microcontroller, determining an EIS signature value based on a dielectric property of the IRM layer.

9. The method of claim 8, further comprising, during an early wear period, adjusting an analyte measurement based on the EIS signature value.

10. The method of claim 9, wherein, during the early wear period, the analyte measurement is adjusted further based on a reference EIS signature value.

11. The method of claim 10, wherein the reference EIS signature value corresponds to a stabilized period that is at least partially after the early wear period.

12. The method of claim 7, wherein the analyte sensor further comprises a high density adhesion ("HDA") layer disposed on the enzyme layer, the HDA layer being positively charged.

13. A method of identifying adjusting a sensor value when an early wear run-in problem occurs in an analyte sensor, the method comprising:
implanting an analyte sensor into a body of a user, wherein the analyte sensor comprises: a base layer for supporting the analyte sensor;
a conductive layer disposed on the base layer, wherein the conductive layer includes a working electrode configured to provide a current signal in presence of glucose;
an interference rejection membrane ("IRM") layer disposed on the working electrode, the IRM layer being negatively charged; and
an enzyme layer disposed on the IRM layer, wherein the enzyme layer includes an enzyme selected to generate a detectable electrical signal upon exposure to the glucose;
accessing an electrochemical impedance spectroscopy (EIS) signature value for each predetermined period during an initial portion of a lifetime of the analyte sensor;
calculating a difference between the EIS signature value and a reference value; and
adjusting a sensor value when the difference between EIS signature values and the reference value is greater than a predetermined threshold,
wherein the reference value is predetermined based on a design configuration of the analyte sensor, and
wherein the EIS signature value is calculated based on a dielectric property of the IRM layer.

14. The method of claim 13, wherein the analyte sensor further comprises a high density adhesion ("HDA") layer disposed on the enzyme layer, the HDA layer being positively charged.

* * * * *